United States Patent
Chaudhuri et al.

(10) Patent No.: US 9,830,558 B1
(45) Date of Patent: Nov. 28, 2017

(54) FAST TRAINING OF SUPPORT VECTOR DATA DESCRIPTION USING SAMPLING

(71) Applicant: SAS Institute Inc., Cary, NC (US)

(72) Inventors: Arin Chaudhuri, Raleigh, NC (US); Deovrat Vijay Kakde, Cary, NC (US); Maria Jahja, Cary, NC (US); Wei Xiao, Raleigh, NC (US); Seung Hyun Kong, Cary, NC (US); Hansi Jiang, Raleigh, NC (US); Sergiy Peredriy, Auburndale, MA (US)

(73) Assignee: SAS Institute Inc., Cary, NC (US)

(*) Notice: Subject to any disclaimer, the term of this patent is extended or adjusted under 35 U.S.C. 154(b) by 0 days.

(21) Appl. No.: 15/185,277

(22) Filed: Jun. 17, 2016

Related U.S. Application Data

(60) Provisional application No. 62/331,084, filed on May 3, 2016.

(51) Int. Cl.
*G06F 15/18* (2006.01)
*G06N 99/00* (2010.01)
*H04L 29/08* (2006.01)
*G06F 17/30* (2006.01)

(52) U.S. Cl.
CPC ..... *G06N 99/005* (2013.01); *G06F 17/30539* (2013.01); *H04L 67/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,587,881 B1* | 7/2003 | Agarwal | ............... | G06F 9/505 709/203 |
| 7,146,386 B2* | 12/2006 | Xiao | ............... | G06F 17/30533 |
| 7,333,992 B2* | 2/2008 | Krishnamoorthy | | G06F 17/30368 |
| 7,653,665 B1* | 1/2010 | Stefani | ............. | G06F 17/30362 707/609 |

(Continued)

OTHER PUBLICATIONS

Ensembles of Support Vector Data Description for Active Learning Based Annotation of Affective Corpora Patrick Thiam; Markus Kächele; Friedhelm Schwenker; Guenther Palm Computational Intelligence, 2015 IEEE Symposium Series on Year: 2015 pp. 1801-1807, DOI: 10.1109/SSCI.2015.251 IEEE Conference Publications.*

(Continued)

*Primary Examiner* — Michael B Holmes
(74) *Attorney, Agent, or Firm* — Bell & Manning, LLC

(57) ABSTRACT

A computing device determines an SVDD to identify an outlier in a dataset. First and second sets of observation vectors of a predefined sample size are randomly selected from a training dataset. First and second optimal values are computed using the first and second observation vectors to define a first set of support vectors and a second set of support vectors. A third optimal value is computed using the first set of support vectors updated to include the second set of support vectors to define a third set of support vectors. Whether or not a stop condition is satisfied is determined by comparing a computed value to a stop criterion. When the stop condition is not satisfied, the first set of support vectors is defined as the third set of support vectors, and operations are repeated until the stop condition is satisfied. The third set of support vectors is output.

30 Claims, 29 Drawing Sheets

(56) References Cited

U.S. PATENT DOCUMENTS

| | | | | |
|---|---|---|---|---|
| 7,757,213 | B2* | 7/2010 | Fusaro | G06Q 10/06 |
| | | | | 715/762 |
| 8,306,928 | B2* | 11/2012 | Chu | G05B 17/02 |
| | | | | 607/45 |
| 8,527,435 | B1 | 9/2013 | Han et al. | |
| 9,536,208 | B1* | 1/2017 | Kakde | G06N 99/005 |
| 9,639,809 | B1* | 5/2017 | Kakde | G06N 99/005 |
| 2006/0265231 | A1* | 11/2006 | Fusaro | G06Q 10/06 |
| | | | | 717/120 |
| 2008/0301070 | A1 | 12/2008 | Bartlett et al. | |
| 2011/0242306 | A1 | 10/2011 | Bressler et al. | |
| 2014/0046878 | A1 | 2/2014 | Lecomte et al. | |
| 2015/0356455 | A1 | 12/2015 | Wu et al. | |
| 2016/0210984 | A1* | 7/2016 | Xiao | G10L 25/60 |
| 2017/0236074 | A1* | 8/2017 | Peredriy | G06N 99/005 |
| | | | | 706/12 |

OTHER PUBLICATIONS

A novel model for building information acquisition optimization technology of remote sensing observation Nan Su; Ye Zhang; Yiming Yan; Yanfeng Gu 2013 IEEE International Geoscience and Remote Sensing Symposium—IGARSS Year: 2013 pp. 3998-4001, DOI: 10.1109/IGARSS.2013.6723709 IEEE Conference Publications.*

Support vector data description for machinery multi-fault classification with unbalanced datasets Lixiang Duan; Mengyun Xie; Tangbo Bai; Jinjiang Wang 2016 IEEE International Conference on Prognostics and Health Management (ICPHM) Year: 2016 pp. 1-6, DOI: 10.1109/ICPHM.2016.7542846 IEEE Conference Publications.*

A unified model for support vector machine and support vector data description Trung Le; Dat Tran; Wanli Ma; Dharmendra Sharma The 2012 International Joint Conference on Neural Networks (IJCNN) Year: 2012 pp. 1-8, DOI: 10.1109/IJCNN.2012.6252642 IEEE Conference Publications.*

Support vector data description for machinery multi-fault classification with unbalanced datasets Lixiang Duan; Mengyun Xie; Tangbo Bai; Jinjiang Wang 2016 IEEE International Conference on Prognostics and Health Management (ICPHM) Year: 2016 pp. 1-6 IEEE Conference Publications.*

A new method for noise data detection based on DBSCAN and SVDD Shengxuan Hao; Xiaofeng Zhou; Hong Song 2015 IEEE International Conference on Cyber Technology in Automation, Control, and Intelligent Systems (CYBER) Year: 2015 pp. 784-789 IEEE Conference Publications.*

Deep learning using partitioned data vectors Ben Mitchell; Hasari Tosun; John Sheppard 2015 International Joint Conference on Neural Networks (IJCNN) Year: 2015 pp. 1-8 IEEE Conference Publications.*

Local Support Vector Machine based on Cooperative Clustering for very large-scale dataset Chuanhuan Yin; Yingying Zhu; Shaomin Mu; Shengfeng Tian 2012 8th International Conference on Natural Computation Year: 2012 pp. 88-92 IEEE Conference Publications.*

Schleif et al., Prior knowledge for Core Vector Data Description, Workshop New Challenges in Neural Computation 2014, Sep. 2, 2014.

A. Banerjee, A Support Vector Method for Anomaly Detection in Hyperspectral Imagery, IEEE Transactions on Geoscience and Remote Sensing, vol. 44, No. 8, Aug. 2006, pp. 2282-2291.

Camci et al., Robust kernel distance multivariate control chart using support vector principles, International Journal of Production Research, vol. 46, No. 18, Sep. 15, 2008, pp. 5075-5095.

Kernel Methods for Remote Sensing Data Analysis, ID: 1198661, Description and table of contents, John Wiley and Sons Ltd, Oct. 2009.

Evangelista et al., Some Properties of the Gaussian Kernel for One Class Learning, Proc. Intern. Conference on Artificial Neural Networks, ICANN07, Porto, Portugal, Sep. 2007.

Kang et al., A differentiated one-class classification method with applications to intrusion detection, Expert Systems with Applications 39, 2012, pp. 3899-3905.

Khazai et al., Anomaly Detection in Hyperspectral Images Based on an Adaptive Support Vector Method, IEEE Geoscience and Remote Sensing Letters, vol. 8, No. 4, Jul. 2011, pp. 646-650.

Khediri et al., Kernel k-means clustering based local support vector domain description fault detection of multimodal processes, Expert Systems with Applications 39, 2012, pp. 2166-2171.

Quah et al., Real-time credit card fraud detection using computational intelligence, Expert Systems with Applications 35, 2008, pp. 1721-1732.

Sukchotrat et al., One-class classification-based control charts for multivariate process monitoring, IIE Transactions, vol. 42, Issue 2, Nov. 20, 2009.

Sun et al., A kernel-distance-based multivariate control chart using support vector methods, int. j. prod. res., vol. 41, No. 13, 2003, pp. 2975-2989.

Tax et al., Support Vector Data Description, Machine Learning, 54, 2004, pp. 45-66.

Tao et al., A novel approach to intrusion detection based on Support Vector Data Description, The 30th Annual Conference of the IEEE Industrial Electronics Society, Busan, Korea, Nov. 2, 2004, pp. 2016-2021.

Tax et al., Support vector domain description, Pattern Recognition Letters 20, 1999, pp. 1191-1199.

Xiao et al., Two methods of selecting Gaussian kernel parameters for one-class SVM and their application to fault detection, Knowledge-Based Systems 59, Jan. 27, 2014, pp. 75-84.

Yang et al., A process-mining framework for the detection of healthcare fraud and abuse, Expert Systems with Applications 31, 2006, pp. 56-68.

Ypma et al., Robust Machine Fault Detection With Independent Component Analysis and Support Vector Data Description, Neural Networks for Signal Processing IX, 1999. Proceedings of the 1999 IEEE Signal Processing Society Workshop, Aug. 1999, Madison, WI, pp. 67-76.

Zhao et al., Pattern recognition-based chillers fault detection method using Support Vector Data Description (SVDD), Applied Energy, 2013.

Yang et al., Anomaly Intrusion Detection Method Based on SVDD, Computer Engineering, vol. 31, No. 3, Feb. 2005.

Chaudhuri et al., Sampling Method for Fast Training of Support Vector Data Description, arXiv:1606.05382v3, Sep. 25, 2016.

Grandvalet et al., Adaptive Scaling for Feature Selection in SVMs, Jan. 2002.

Chapelle et al., Choosing Multiple Parameters for Support Vector Machines, Machine Learning, 46, 2002, pp. 131-159.

Cristianini et al., Dynamically Adapting Kernels in Support Vector Machines, Advances in Neural Information Processing Systems 11, Jan. 1998.

Sheather et al., A Reliable Data-Based Bandwidth Selection Method for Kernel Density Estimation, Journal of the Royal Statistical Society. Series B (Methodological), vol. 53, Issue 3, 1991, pp. 683-690.

Kakde et al., Peak Criterion for Choosing Gaussian Kernel Bandwidth in Support Vector Data Description, arXiv:1602.05257v1, Feb. 17, 2016.

Evangelista et al., Some Properties of the Gaussian Kernel for One Class Learning, Proc. Intern. Conference on Artificial Neural Networks, ICANN07 Porto, Portugal, Sep. 2007, Lecture Notes in Computer Science, vol. 4668, Part I, Springer, Berlin, Germany, 2007, pp. 269-278.

Deng et al., Model Selection for Anomaly Detection in Wireless Ad Hoc Networks, Proceedings of the 2007 IEEE Symposium on Computational Intelligence and Data Mining, Mar. 1, 2007, pp. 540-546.

* cited by examiner

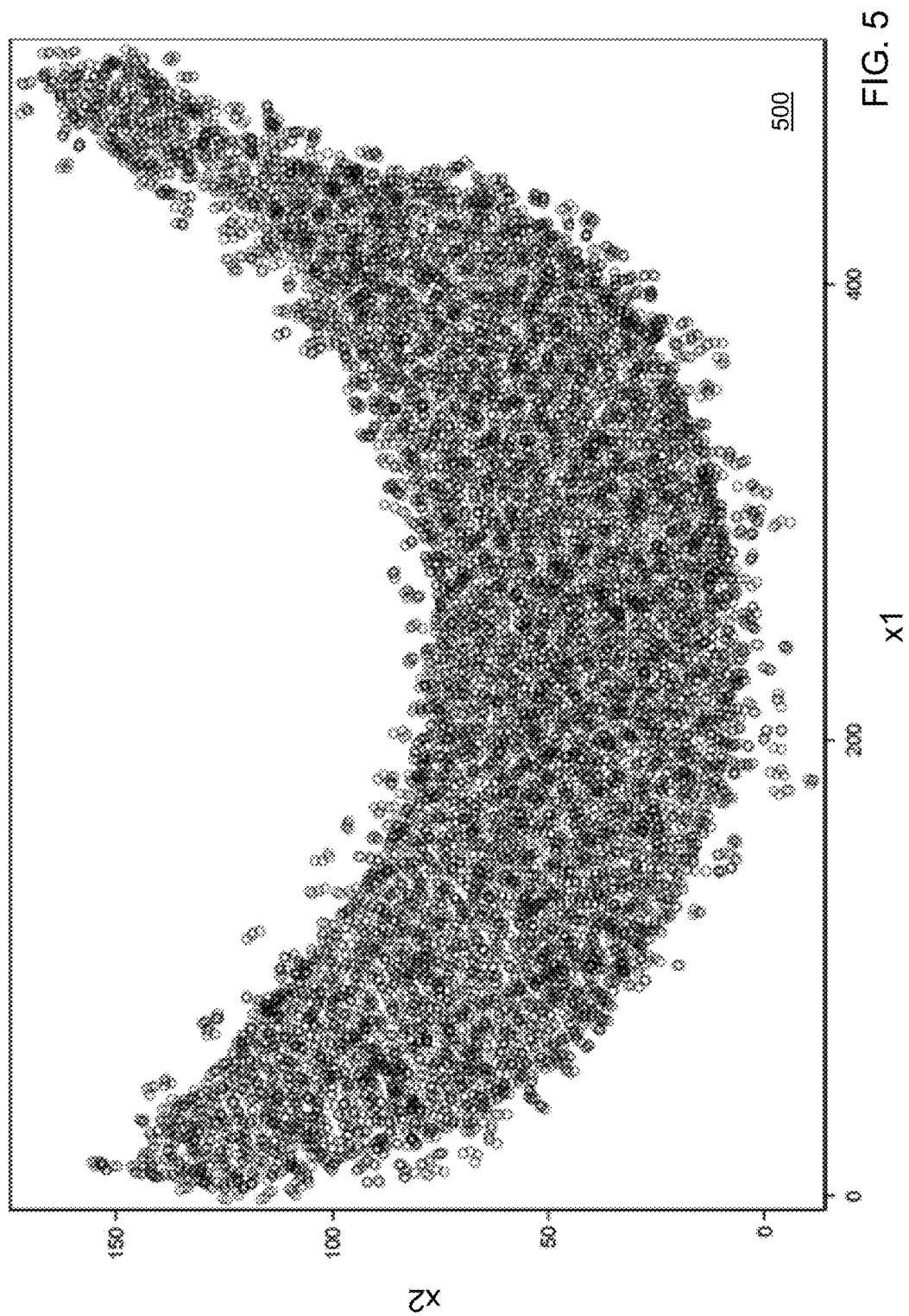

US 9,830,558 B1

FAST TRAINING OF SUPPORT VECTOR DATA DESCRIPTION USING SAMPLING

CROSS-REFERENCE TO RELATED APPLICATIONS

The present application claims the benefit of 35 U.S.C. §119(e) to U.S. Provisional Patent Application No. 62/331,084 filed on May 3, 2016, the entire contents of which is hereby incorporated by reference.

BACKGROUND

Support vector data description (SVDD) is a machine-learning technique used for single class classification and outlier detection. SVDD formulation with a kernel function provides a flexible data description around data.

The SVDD of a dataset is obtained by solving a quadratic programming problem. The time required to solve the quadratic programming problem is directly related to the number of observations in the training dataset resulting in a very high computing time for large training datasets.

SUMMARY

In another example embodiment, a non-transitory computer-readable medium is provided having stored thereon computer-readable instructions that, when executed by a computing device, cause the computing device to determine a support vector data description for outlier identification. A first set of observation vectors is randomly selected from a training dataset. A number of the first set of observation vectors is a predefined sample size. A first optimal value of an objective function defined for a support vector data description (SVDD) model is computed using the selected first set of observation vectors to define a first set of support vectors that define a first data description for the training dataset. (a) A second set of observation vectors is randomly selected from the training dataset, wherein a number of the second set of observation vectors is the predefined sample size. (b) A second optimal value of the objective function is computed using the selected second set of observation vectors to define a second set of support vectors, wherein the second set of support vectors define a second data description for the training dataset. (c) The first set of support vectors is updated to include the defined second set of support vectors. (d) A third optimal value of the objective function is computed using the updated first set of support vectors to define a third set of support vectors, wherein the third set of support vectors define a third data description for the training dataset. (e) A value of a stop parameter is computed. (f) Whether or not a stop condition is satisfied is determined by comparing the computed value to a stop criterion. (g) When the stop condition is not satisfied, the first set of support vectors is defined as the defined third set of support vectors, and (a)-(g) are repeated until the stop condition in (f) is satisfied. When the stop condition in (f) is satisfied, the defined third set of support vectors are output for identifying an outlier in a scoring dataset.

In yet another example embodiment, a computing device is provided. The system includes, but is not limited to, a processor and a non-transitory computer-readable medium operably coupled to the processor. The computer-readable medium has instructions stored thereon that, when executed by the computing device, cause the computing device to determine a support vector data description for outlier identification.

In an example embodiment, a method of determining a support vector data description for outlier identification is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 5 depicts a first example dataset having a banana shape in accordance with an illustrative embodiment.

DETAILED DESCRIPTION

Figure 1:
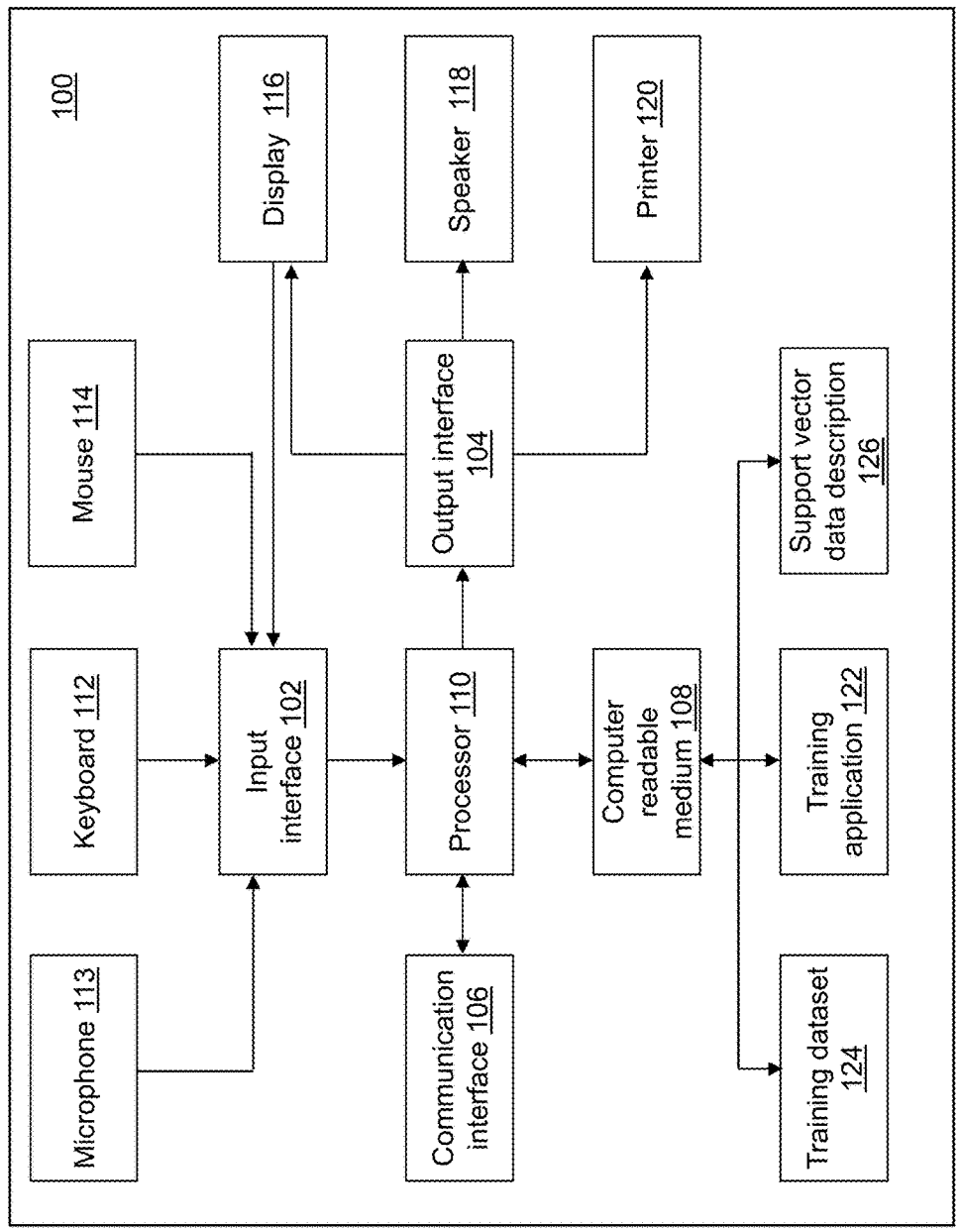
FIG. 1 depicts a block diagram of a support vector data description (SVDD) training device in accordance with an illustrative embodiment.

Referring to FIG. 1, a block diagram of a support vector data description (SVDD) training device 100 is shown in accordance with an illustrative embodiment. SVDD training device 100 may include an input interface 102, an output interface 104, a communication interface 106, a non-transitory computer-readable medium 108, a processor 110, a training application 122, a training dataset 124, and a support vector data description (SVDD) 126. Fewer, different, and/or additional components may be incorporated into SVDD training device 100.

Input interface 102 provides an interface for receiving information from the user or another device for entry into SVDD training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into SVDD training device 100 or to make selections presented in a user interface displayed on display 116. The same interface may support both input interface 102 and output interface 104. For example, display 116 comprising a touch screen provides a mechanism for user input and for presentation of output to the user. SVDD training device 100 may have one or more input interfaces that use the same or a different input interface technology. The input interface technology further may be accessible by SVDD training device 100 through communication interface 106.

Output interface 104 provides an interface for outputting information for review by a user of SVDD training device 100 and/or for use by another application or device. For example, output interface 104 may interface with various output technologies including, but not limited to, display 116, a speaker 118, a printer 120, etc. SVDD training device 100 may have one or more output interfaces that use the same or a different output interface technology. The output interface technology further may be accessible by SVDD training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. SVDD training device 100 may have one or more communication interfaces that use the same or a different communication interface technology. For example, SVDD training device 100 may support communication using an Ethernet port, a Bluetooth antenna, a telephone jack, a USB port, etc. Data and messages may be transferred between SVDD training device 100 and another computing device using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. SVDD training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. SVDD training device 100 also may have one or more drives that support the loading of a memory media such as a CD, DVD, an external hard drive, etc. One or more external hard drives further may be connected to SVDD training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. SVDD training device 100 may include a plurality of processors that use the same or a different processing technology.

Training application 122 performs operations associated with defining SVDD 126 from data stored in training dataset 124. SVDD 126 may be used to classify data stored in a scoring dataset and to identify outliers in the scoring dataset that may be stored in an outlier dataset to support various data analysis functions as well as provide alert/messaging related to the identified outliers. Some or all of the operations described herein may be embodied in training application 122. The operations may be implemented using hardware, firmware, software, or any combination of these methods.

Referring to the example embodiment of FIG. 1, training application 122 is implemented in software (comprised of computer-readable and/or computer-executable instructions)

stored in computer-readable medium 108 and accessible by processor 110 for execution of the instructions that embody the operations of training application 122. Training application 122 may be written using one or more programming languages, assembly languages, scripting languages, etc. Training application 122 may be integrated with other analytic tools. For example, training application 122 may be part of SAS® Enterprise Miner™ developed and provided by SAS Institute Inc. of Cary, N.C. that may be used to create highly accurate predictive and descriptive models based on analysis of vast amounts of data from across an enterprise. Data mining is applicable in a variety of industries.

Training application 122 may be integrated with other system processing tools to automatically process data generated as part of operation of an enterprise, device, system, facility, etc., to identify any outliers in the processed data, and to provide a warning or alert associated with the outlier identification using input interface 102, output interface 104, and/or communication interface 106 so that appropriate action can be initiated in response to the outlier identification.

Training application 122 may be implemented as a Web application. For example, training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observation vectors or records, and the columns may be referred to as variables. Training dataset 124 may be transposed. Training dataset 124 may include unsupervised data. The plurality of variables may define multiple dimensions for each observation vector. An observation vector $x_i$ may include a value for each of the plurality of variables associated with the observation i. Each variable of the plurality of variables describes a characteristic of a physical object. For example, if training dataset 124 includes data related to operation of a vehicle, the variables may include an oil pressure, a speed, a gear indicator, a gas tank level, a tire pressure for each tire, an engine temperature, a radiator level, etc. Training dataset 124 may include data captured as a function of time for one or more physical objects.

Training dataset 124 may be stored on computer-readable medium 108 or on one or more computer-readable media of distributed computing system 2128 and accessed by SVDD training device 100 using communication interface 106, input interface 102, and/or output interface 104. Data stored in training dataset 124 may be sensor measurements or signal values captured by a sensor, may be generated or captured in response to occurrence of an event or a transaction, generated by a device such as in response to an interaction by a user with the device, etc. The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 124 may be captured at different time points periodically, intermittently, when an event occurs, etc. One or more columns may include a time value.

Training dataset 124 may include data captured under normal operating conditions of the physical object. Training dataset 124 may include data captured at a high data rate such as 200 or more observations per second for one or more physical objects. For example, data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Some data may be processed with an event stream processing engine, which may reside in the cloud or in an edge device before being stored in training dataset 124.

Training dataset 124 may be stored in various compressed formats such as a coordinate format, a compressed sparse column format, a compressed sparse row format, etc. Training dataset 124 further may be stored using various structures as known to those skilled in the art including a file system, a relational database, a system of tables, a structured query language database, etc. on SVDD training device 100 or on distributed computing system 2128. SVDD training device 100 may coordinate access to training dataset 124 that is distributed across a plurality of computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server developed and provided by SAS Institute Inc. of Cary, N.C. may be used as an analytic platform to enable multiple users to concurrently access data stored in training dataset 124. Some systems may use SAS In-Memory Statistics for Hadoop® developed and provided by SAS Institute Inc. of Cary, N.C. to read big data once and analyze it several times by persisting it in-memory for the entire session. Some systems may be of other types and configurations.

A SVDD model is used in domains where a majority of data in training dataset 124 belongs to a single class. An SVDD model for normal data description builds a minimum radius hypersphere around the data. The objective function for the SVDD model for normal data description is $$\max(\Sigma_{i=1}^{n}\alpha_{i}(x_{i}\cdot x_{i})-\Sigma_{i=1}^{n}\Sigma_{j=1}^{n}\alpha_{i}\alpha_{j}(x_{i}\cdot x_{j})), \quad (1)$$

subject to:

$$\Sigma_{i=1}^{n}\alpha_{i}=1, \quad (2)$$

$$0\leq\alpha_{i}\leq C, \forall i=1,\ldots,n, \quad (3)$$

where $x_i \in \mathbb{R}^m$, $i=1, \ldots, n$ represents n observations in training dataset 124, $\alpha_i \in \mathbb{R}$ are Lagrange constants, $C=1/nf$ is a penalty constant that controls a trade-off between a volume and errors, and f is an expected outlier fraction. The expected outlier fraction is generally known to an analyst. Data preprocessing can ensure that training dataset 124 belongs to a single class. In this case, f can be set to a very low value such as 0.001. SV is the set of support vectors that includes the observation vectors in training dataset 124 that have $C \geq \alpha_i > 0$ after solving equation (1) above. $SV_{<C}$ is a subset of the support vectors that includes the observation vectors in training dataset 124 that have $C > \alpha_i > 0$ after solving equation (1) above.

Depending upon a position of an observation vector, the following results are true:

Center position: $\Sigma_{i=1}^{n}\alpha_{i}x_{i}=\alpha.$ (4)

Inside position: $\|x_i-\alpha\|<R \rightarrow \alpha_i=0.$ (5)

Data description position: $\|x_i-\alpha\|=R \rightarrow 0<\alpha_i<C.$ (6)

Outside position: $\|x_i-\alpha\|>R \rightarrow \alpha_i=C.$ (7)

where $\alpha$ is a center of the hypersphere and R is a radius of the hypersphere. The radius of the hypersphere is calculated as:

$$R^2 = x_k \cdot x_k - 2\Sigma_{i=1}^{N_{SV}}\alpha_i(x_i \cdot x_k)+\Sigma_{i=1}^{N_{SV}}\Sigma_{j=1}^{N_{SV}}\alpha_i\alpha_j(x_i \cdot x_j) \quad (8)$$

using any $x_k \in SV_{<C}$, $x_i$ and $x_j$ are the support vectors, $\alpha_i$ and $\alpha_j$ are the Lagrange constants of the associated support vector, and $N_{SV}$ is a number of the support vectors included in the set of support vectors. An observation z is indicated as an outlier when $dist^2(z)>R^2$, where $dist^2(z)=(z \cdot z) - 2\Sigma_{i=1}^{N_{SV}}\alpha_i(x_i \cdot z) + \Sigma_{i=1}^{N_{SV}}\Sigma_{j=1}^{N_{SV}}\alpha_i\alpha_j(x_i \cdot x_j)$ where z is the observation vector.

Figure 2:
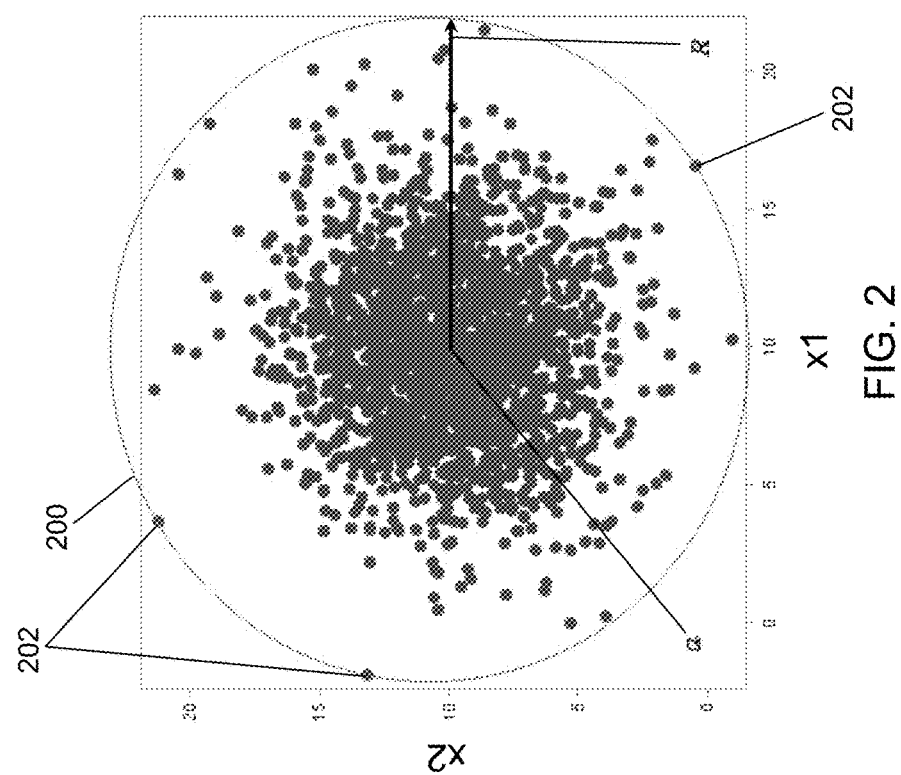
FIG. 2 depicts a SVDD result defining a normal data description in accordance with an illustrative embodiment.

Referring to FIG. 2, a SVDD is illustrated in accordance with an illustrative embodiment that defines a normal data description 200 having a radius R from a center a. Data description 200 is characterized by observation vectors 202 (shown as data points on the graph), which are the set of support vectors SV. For illustration, observation vectors 202 are defined by values of variables x1 and x2.

Normal data description 200 can include a significant amount of space with a very sparse distribution of training observations. Scoring with this model can increase the probability of false positives. Hence, instead of a circular shape, a compact bounded outline around the data that approximates a shape of data in training dataset 124 is preferred. This is possible using a kernel function. The SVDD is made flexible by replacing the inner product $(x_i \cdot x_j)$ with a suitable kernel function $K(x_i, x_j)$. A Gaussian kernel function is described herein, though this is not intended to be limiting. For example, any exponential function or polynomial function may be used. The Gaussian kernel function may be defined as:

$$K(x_i, x_j) = \exp\frac{-\|x_i - x_j\|^2}{2s^2} \quad (9)$$

where s is a kernel parameter that is termed a Gaussian bandwidth parameter.

The objective function for the SVDD model with the Gaussian kernel function is $$\max(\Sigma_{i=1}^{n}\alpha_{i}K(x_{i},x_{i})-\Sigma_{i=1}^{n}\Sigma_{j=1}^{n}\alpha_{i}\alpha_{j}K(x_{i},x_{j})), \quad (10)$$

subject to:

$$\Sigma_{i=1}^{n}\alpha_{i}=1, \quad (11)$$

$$0\leq\alpha_{i}\leq C, \forall i=1,\ldots,n \quad (12)$$

Where again SV is the set of support vectors that includes the observation vectors in training dataset 124 that have $C \geq \alpha_i > 0$ after solving equation (1) above. $SV_{<C}$ is the subset of the support vectors that includes the observation vectors in training dataset 124 that have $C > \alpha_i > 0$ after solving equation (1) above.

The results from equations (4) to (7) above remain valid. The threshold is computed as:

$$R^2 = K(x_k,x_k) - 2\Sigma_{i=1}^{N_{SV}}\alpha_i K(x_i,x_k) + \Sigma_{i=1}^{N_{SV}}\Sigma_{j=1}^{N_{SV}}\alpha_i\alpha_j K(x_i,x_j) \quad (13)$$

using any $x_k \in SV_{<C}$, where $x_i$ and $x_j$ are the support vectors, $\alpha_i$ and $\alpha_j$ are the Lagrange constants of the associated support vector, and $N_{SV}$ is a number of the support vectors included in the set of support vectors.

An observation vector z is indicated as an outlier when $dist^2(z)>R^2$, where $$dist^2(z) = K(z,z) - 2\Sigma_{i=1}^{N_{SV}}\alpha_i K(x_i,z) + \Sigma_{i=1}^{N_{SV}}\Sigma_{j=1}^{N_{SV}}\alpha_i\alpha_j K(x_i,x_j). \quad (14)$$

$\Sigma_{i=1}^{n}\Sigma_{j=1}^{n}\alpha_i\alpha_j K(x_i, x_j)$ is a constant that can be denoted as W and that can be determined from the set of support vectors. $R^2$ is a threshold determined using the set of support vectors. For a Gaussian kernel function, $K(z,z)=1$. Thus, equation (14) can be simplified to $dist^2(z)=1-2\Sigma_{i=1}^{N_{SV}}\alpha_i K(x_i, z)+W$ for a Gaussian kernel function.

Figure 3:
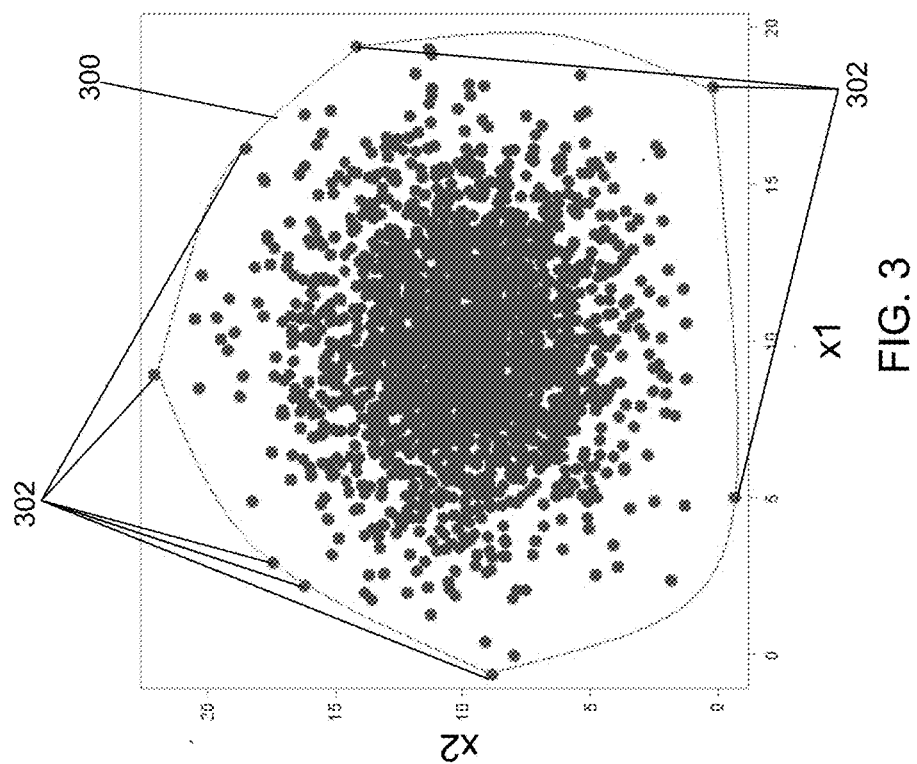
FIG. 3 depicts an SVDD result defining a flexible data description using a Gaussian kernel function in accordance with an illustrative embodiment.

Referring to FIG. 3, a SVDD is shown in accordance with an illustrative embodiment that defines a flexible data description 300. Flexible data description 300 is characterized by support vectors 302, which are the set of support vectors SV.

Figure 4A:
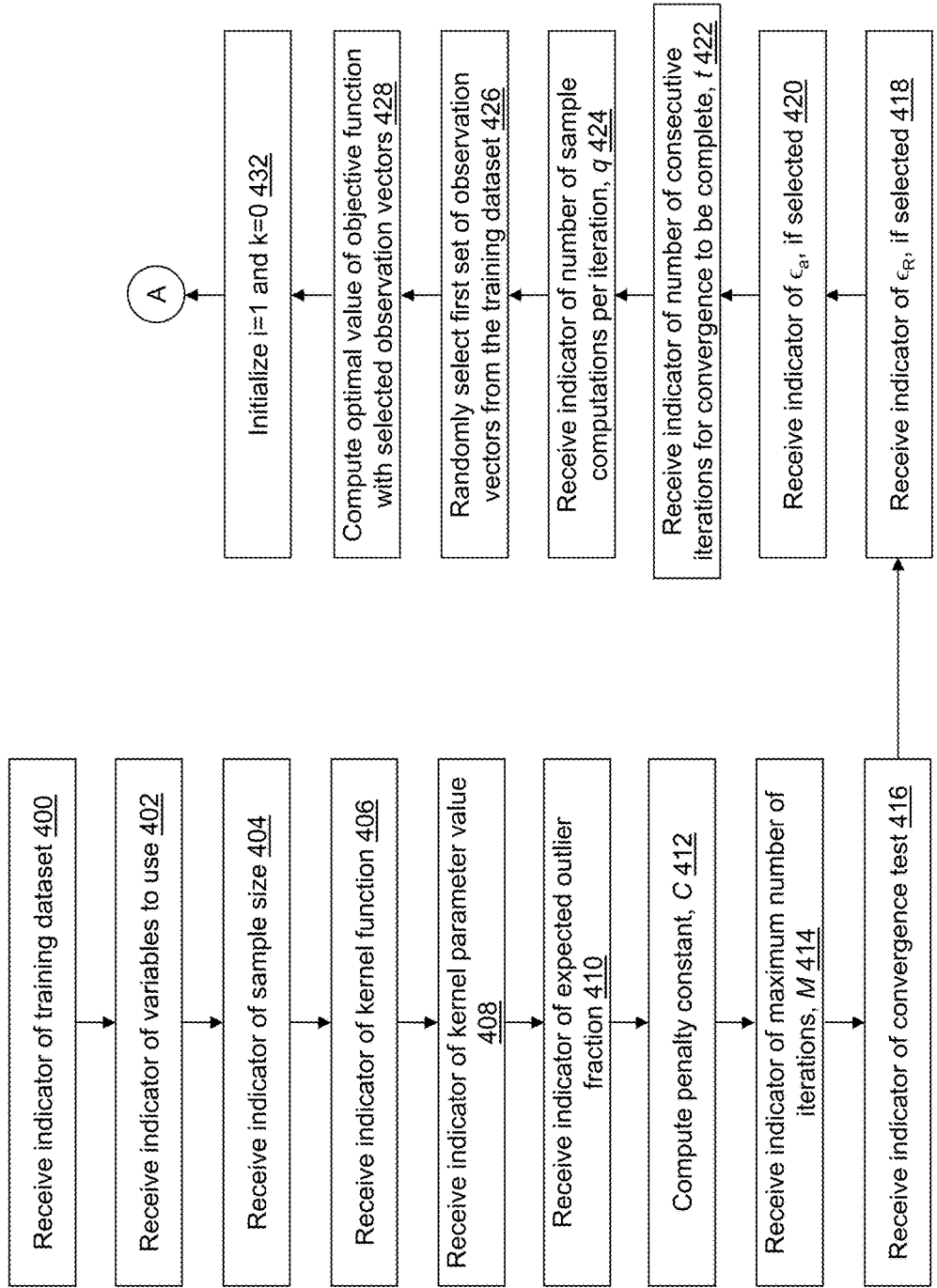
FIGS. 4A, 4B, and 4C depict a flow diagram illustrating examples of operations performed by the SVDD training device of FIG. 1 in accordance with an illustrative embodiment.
Figure 4B:
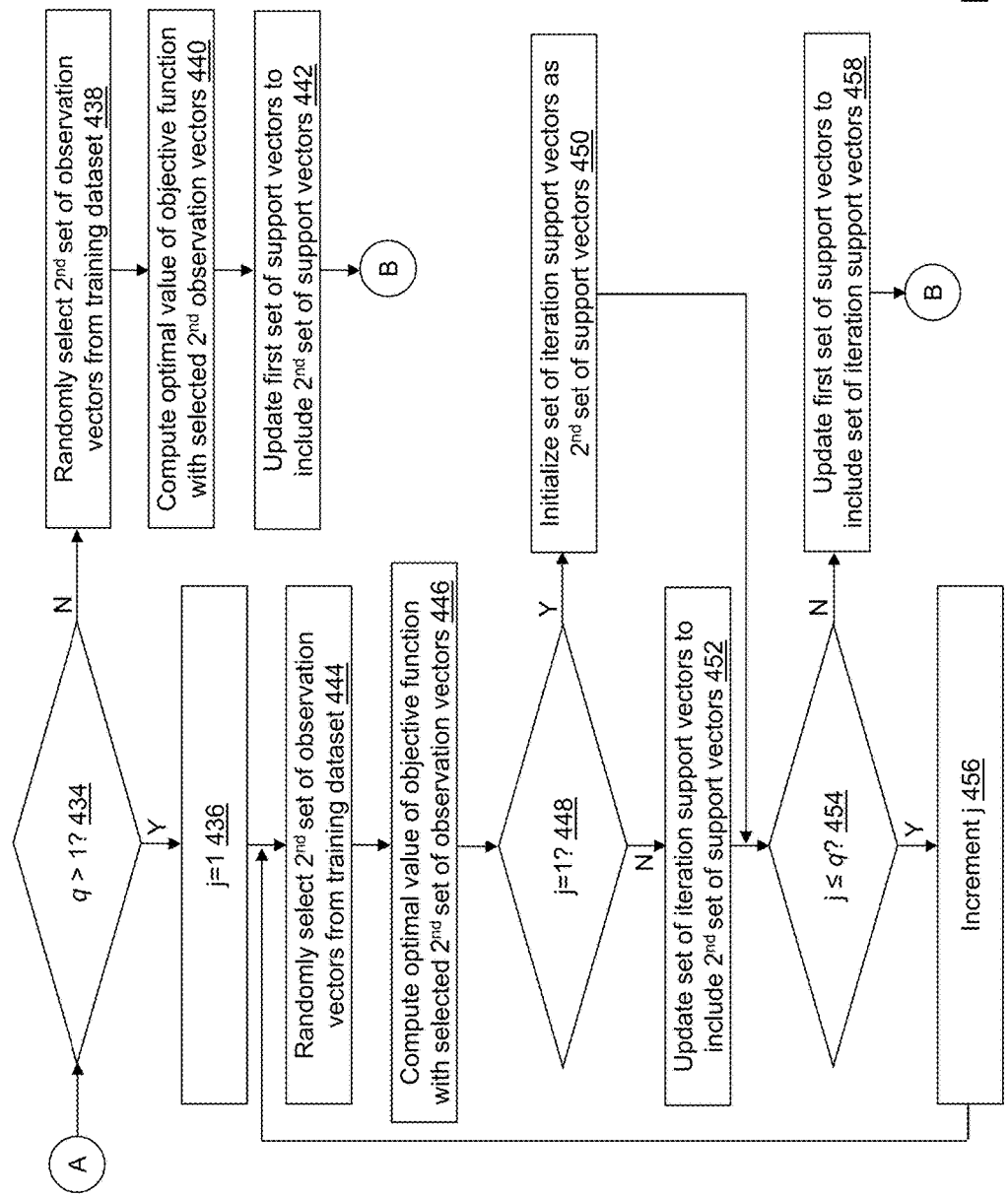
Figure 4C:
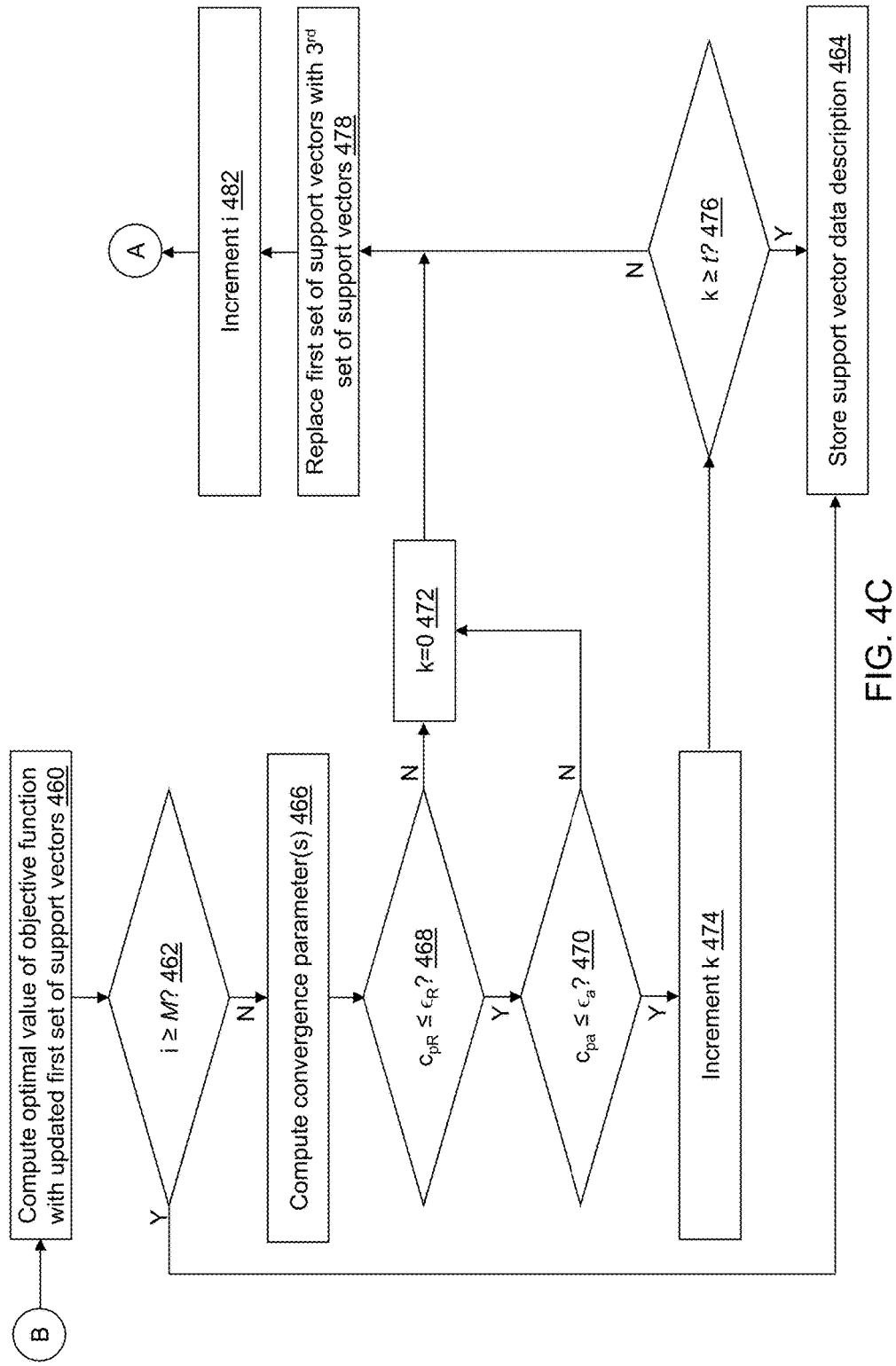

Referring to FIGS. 4A, 4B, and 4C, example operations associated with training application 122 are described. For example, training application 122 may be used to create SVDD 126 from training dataset 124. Instead of using all observations from training dataset 124, training application 122 computes SVDD 126 by iteratively computing an SVDD on independent random samples obtained from training dataset 124 and combining them. Training application 122 has been shown to work well even when the random samples have only a few observations.

Additional, fewer, or different operations may be performed depending on the embodiment of training application 122. The order of presentation of the operations of FIGS. 4A, 4B, and 4C is not intended to be limiting. Although some of the operational flows are presented in sequence, the various operations may be performed in various repetitions, concurrently (in parallel, for example, using threads and/or a distributed computing system), and/or in other orders than those that are illustrated. For example, a user may execute training application 122, which causes presentation of a first user interface window, which may include a plurality of menus and selectors such as drop down menus, buttons, text boxes, hyperlinks, etc. associated with training application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by training application 122.

Referring to FIG. 4A, in an operation 400, a first indicator may be received that indicates training dataset 124. For example, the first indicator indicates a location and a name of training dataset 124. As an example, the first indicator may be received by training application 122 after selection from a user interface window or after entry by a user into a user interface window. In an alternative embodiment, training dataset 124 may not be selectable. For example, a most recently created dataset may be used automatically.

In an operation 402, a second indicator may be received that indicates a plurality of variables of training dataset 124 to define $x_i$. The second indicator may indicate that all or only a subset of the variables stored in training dataset 124 be used to define SVDD 126. For example, the second indicator indicates a list of variables to use by name, column number, etc. In an alternative embodiment, the second indicator may not be received. For example, all of the variables may be used automatically.

In an operation 404, a third indicator may be received that indicates a sample size $N_s$. The third indicator indicates a number of observations to use from training dataset 124, a percentage of observations to use from training dataset 124, etc. $N_s$ may be very small. For illustration, $N_s$ may be between 3 and 20 for a training dataset that includes greater than 15,000 observations for a dataset with two variables. $N_s$ observations may be created from training dataset 124 by sampling. An example sampling algorithm is uniform sampling though other random sampling algorithms may be used. For illustration, the sample size $N_s$ may be selected to be any value greater than a number of the plurality of variables of training dataset 124 to define $x_i$ indicated in operation 402.

In an operation 406, a fourth indicator of a kernel function to apply may be received. For example, the fourth indicator indicates a name of a kernel function. The fourth indicator may be received by training application 122 after selection from a user interface window or after entry by a user into a user interface window. A default value for the kernel function may further be stored, for example, in computer-readable medium 108. As an example, a kernel function may be selected from "Gaussian", "Exponential", etc. For example, a default kernel function may be the Gaussian kernel function though any positive definite kernel function could be used. Of course, the kernel function may be labeled or selected in a variety of different manners by the user as understood by a person of skill in the art. In an alternative embodiment, the kernel function may not be selectable, and a single kernel function is implemented in training application 122. For example, the Gaussian kernel function may be used by default or without allowing a selection.

In an operation 408, a fifth indicator of a kernel parameter value to use with the kernel function may be received. For example, a value for s, the Gaussian bandwidth parameter, may be received for the Gaussian kernel function. In an alternative embodiment, the fifth indicator may not be received. For example, a default value for the kernel parameter value may be stored, for example, in computer-readable medium 108 and used automatically or the kernel parameter value may not be used. In another alternative embodiment, the value of the kernel parameter may not be selectable. Instead, a fixed, predefined value may be used.

In an operation 410, a sixth indicator of a value of the expected outlier fraction f may be received. In an alternative embodiment, the sixth indicator may not be received. For example, a default value may be stored, for example, in computer-readable medium 108 and used automatically. In another alternative embodiment, the value of the expected outlier fraction f may not be selectable. Instead, a fixed, predefined value may be used.

In an operation 412, a value of the penalty constant C=1/nf may be computed from n and f.

In an operation 414, a seventh indicator of a value of a maximum number of iterations M may be received. In an alternative embodiment, the seventh indicator may not be received. For example, a default value may be stored, for example, in computer-readable medium 108 and used automatically or the maximum number of iterations M may not be used. In another alternative embodiment, the value of the maximum number of iterations M may not be selectable. Instead, a fixed, predefined value may be used. The maximum number of iterations M may be identified as a first stop criterion. The maximum number of iterations M may be selected to stop execution when convergence is not being reached. Merely for illustration, the maximum number of iterations M may be set between 10 and 1000 though the user may determine that other values are more suitable for their application as understood by a person of skill in the art, for example, on the accuracy desired, computing resources available, etc.

In an operation 416, an eighth indicator of a convergence test may be received. For example, the eighth indicator indicates a name of a convergence test. The eighth indicator may be received by training application 122 after selection from a user interface window or after entry by a user into a user interface window. A default value for the convergence test may further be stored, for example, in computer-readable medium 108. As an example, a convergence test may be selected from "Max Iterations", "$R^2$ only", "a only", "$R^2$ and a", etc. For example, a default convergence test may be "$R^2$ and a" as discussed further below. Of course, the convergence test may be labeled or selected in a variety of different manners by the user as understood by a person of skill in the art. In an alternative embodiment, the convergence test may not be selectable, and a single convergence test is implemented by training application 122. For example, the convergence test "$R^2$ and a" as discussed further below may be used by default or without allowing a selection.

In an operation 418, a ninth indicator of a value of a distance tolerance value $\epsilon_R$ may be received if the convergence test selected includes an evaluation of changes in value of the threshold $R^2$ from iteration to iteration. In an alternative embodiment, the ninth indicator may not be received. For example, a default value may be stored, for example, in computer-readable medium 108 and used automatically or the distance tolerance value $\epsilon_R$ may not be used. In another alternative embodiment, the value of the distance tolerance parameter may not be selectable. Instead, a fixed, predefined value may be used. The distance tolerance parameter $\epsilon_R$ may be identified as a second stop criterion.

In an operation 420, a tenth indicator of a value of a center tolerance value $\epsilon_\alpha$ may be received if the convergence test selected includes an evaluation of changes in a center a from iteration to iteration. In an alternative embodiment, the tenth indicator may not be received. For example, a default value may be stored, for example, in computer-readable medium 108 and used automatically or the center tolerance parameter $\epsilon_\alpha$ may not be used. In another alternative embodiment, the value of the center tolerance parameter may not be selectable. Instead, a fixed, predefined value may be used. The center tolerance parameter $\epsilon_\alpha$ may be identified as a third stop criterion. Values for the tolerance parameters $\epsilon_R$ and/or $\epsilon_\alpha$ may be selected to achieve a representational quality of training dataset 124 by SVDD 126.

In an operation 422, an eleventh indicator of a value of a number of consecutive iterations for convergence to be complete t may be received. In an alternative embodiment, the eleventh indicator may not be received. For example, a default value may be stored, for example, in computer-readable medium 108 and used automatically or the number of consecutive iterations for convergence to be complete t may not be used. In another alternative embodiment, the value of the number of consecutive iterations for convergence to be complete may not be selectable. Instead, a fixed, predefined value may be used. Use of the number of consecutive iterations for convergence to be complete avoids convergence to a local extrema by requiring that the stop criterion be satisfied for a consecutive number of iterations. Merely for illustration, the number of consecutive iterations for convergence to be complete t may be set between 1 and 10 though the user may determine that other values are more suitable for their application. The number of consecutive iterations for convergence to be complete t set to a value of 5 has been used to achieve quality results for SVDD 126.

In an operation 424, a twelfth indicator of a value of a number of sample computations per iteration q may be received. In an alternative embodiment, the twelfth indicator may not be received. For example, a default value may be stored, for example, in computer-readable medium 108 and used automatically or the number of sample computations per iteration q may not be used. In another alternative embodiment, the value of the number of sample computations per iteration may not be selectable. Instead, a fixed, predefined value may be used. Merely for illustration, the number of sample computations per iteration q may be set between 1 and 5 though the user may determine that other values are more suitable for their application. The sample computations per iteration q set to a value of 2 or 3 has been used to achieve quality results for SVDD 126.

In an operation 426, a first set of observation vectors $x_i$ are randomly selected from training dataset 124, for example, using uniform random sampling to select the sample size $N_s$ number of observations. Each observation vector $x_i$ includes values for each of the plurality of variables indicated in operation 402.

In an operation 428, an optimal value for the objective function is computed by optimizing the objective function using the kernel function defined based on the fourth indicator and the selected first set of observation vectors $x_i$. For example, equations (10)-(13) above are used to solve for SV, a first set of support vectors that have $0<\alpha_i \leq C$. As part of the solving for the optimal solution, values for the computed penalty constant C and/or the kernel parameter value may be used as indicated above. Values for the Lagrange constants $\alpha_i$ for each support vector of the first set of support vectors, for $R^2$, and for the center position $\alpha$ are computed as part of the optimal solution. Only the $SV_{<C}$ are needed for the computations of $R^2$, and only the SV are needed for the computations of a, which avoids an additional read of training dataset 124 thereby improving performance.

In an operation 432, iteration counter values i and k may be initialized. For example, i may be initialized to one, and k may be initialized to zero. i may be identified as an iteration counter, and k may be identified as a consecutive convergence counter.

Referring to FIG. 4B, in an operation 434, a determination is made concerning whether or not the number of sample computations per iteration q>1. In an alternative embodiment, the number of sample computations per iteration, q may not be used, in which case, operations 434, 436, and 444-458 are not implemented by training application 122. As another option, the sample computations per iteration q may be implemented by training application 122, but not selected for use by the user by setting q≤1 to skip operations 434, 436, and 444-458. When q>1, processing continues in an operation 436. When q≤1, processing continues in an operation 438.

In operation 436, a sampling iteration counter value j may be initialized, and processing continues in an operation 444. For example, j may be initialized to one.

In an operation 438, a second set of observation vectors $x_i$ are randomly selected from training dataset 124, for example, using uniform random sampling to select the sample size $N_s$ number of observations a next time. Each second observation vector $x_i$ includes values for each of the plurality of variables indicated in operation 402.

In an operation 440, an optimal value for the objective function is computed by optimizing the objective function using the kernel function defined based on the fourth indicator and the selected second set of observation vectors $x_i$. For example, equations (10)-(13) above are used to solve for SV, a second set of support vectors that have $0<\alpha_i \leq C$, along with values for the Lagrange constants $\alpha_i$ for each support vector of the second set of support vectors, for $R^2$, and for the center position $\alpha$.

In an operation 442, the first set of support vectors are updated to include the second set of support vectors SV computed in operation 440, and processing continues in an operation 460 shown referring to FIG. 4C.

In operation 444, the second set of observation vectors $x_i$ are randomly selected from training dataset 124, for example, using uniform random sampling to select the sample size $N_s$ number of observations a next time. Each second observation vector $x_i$ includes values for each of the plurality of variables indicated in operation 402.

In an operation 446, an optimal value for the objective function is computed by optimizing the objective function using the kernel function defined based on the fourth indicator and the selected second set of observation vectors $x_i$. For example, equations (10)-(13) above are used to solve for SV, a second set of support vectors that have $0<\alpha_i \leq C$, along with values for the Lagrange constants $\alpha_i$ for each support vector of the second set of support vectors, for $R^2$, and for the center position $\alpha$.

In an operation 448, a determination is made concerning whether or not sampling iteration counter value j=1. When j=1, processing continues in an operation 450. When j≠1, processing continues in an operation 452.

In operation 450, a set of iteration support vectors is initialized with the second set of support vectors SV computed in operation 446, and processing continues in an operation 454.

In operation 452, the set of iteration support vectors is updated to include the second set of support vectors SV computed in operation 446, and processing continues in operation 454.

In operation 454, a determination is made concerning whether or not the number of sample computations per iteration q have been performed by comparing the sampling iteration counter value j to the number of sample computations per iteration q. When j≤q, processing continues in an operation 456. When j>q, processing continues in an operation 458.

In operation 456, the sampling iteration counter value j is incremented by adding one to the current value, and processing continues in operation 444 to process a next sampled set of observation vectors to supplement the set of iteration support vectors.

In operation 458, the first set of support vectors is updated to include the set of iteration support vectors, and processing continues in operation 460 shown referring to FIG. 4C.

Referring to FIG. 4C, in operation 460, an optimal value for the objective function is computed by optimizing the objective function using the kernel function defined based on the fourth indicator and the updated first set of support vectors. For example, equations (10)-(13) above are used to solve for SV, a third set of support vectors that have $0 < \alpha_i \leq C$, along with values for the Lagrange constants $\alpha_i$ for each support vector of the third set of support vectors, for $R^2$, and for the center position $\alpha$. The penalty constant C=1/nf may be computed for n equal to a number of vectors of the updated first set of support vectors.

In an operation 462, a determination is made concerning whether or not i≥M. In an alternative embodiment, the maximum number of iterations M may not be used, in which case, operation 462 is not implemented by training application 122. When i≥M, processing continues in an operation 464. When i<M, processing continues in an operation 466. i≥M is a first stop condition.

In operation 464, the third set of support vectors, $\alpha_i$ the Lagrange constants for each of the third set of support vectors, the center position $\alpha$, and/or $R^2$ computed from the third set of support vectors are stored as SVDD 126, and processing is complete for defining SVDD 126. Any other constants associated with the third set of support vectors may be stored. For example, K(z,z)=1 may be stored when the Gaussian kernel function is used and/or $W = \sum_{i=1}^{N} \sum_{j=1}^{N} \alpha_i \alpha_j K(x_i, x_j)$ may be stored for use in computing $dist^2(z)$ when scoring is performed as discussed further below.

In operation 466, one or more convergence parameters may be computed as additional stop conditions dependent on the convergence test indicated in operation 416. For example, when "Max Iterations" is indicated, none of operations 466-476 may be performed and no convergence parameters are computed. When "$R^2$" is indicated, operation 470 may be skipped, and only an $R^2$ convergence parameter is computed. When "a" is indicated, operation 468 may be skipped and only an a convergence parameter is computed. When "$R^2$ and a" is indicated, $R^2$ and a convergence parameters are both computed.

The $R^2$ convergence parameter may be computed as $c_{pR} = \|R_j^2 - R_{j-1}^2\|/R_{j-1}^2$, where $R_j^2$ is the threshold computed using the third set of support vectors that have $0 < \alpha_i < C$ computed in operation 460, and $R_{j-1}^2$ is the threshold computed using the first set of support vectors that have $0 < \alpha_i < C$. Prior to computing $c_{pR}$, a value of $R_{j-1}^2$ may be tested to determine if the value is zero. If so, $c_{pR}$ may be set to a very large value.

The a convergence parameter may be computed as $c_{p\alpha} = \|\alpha_j - \alpha_{j-1}\|/\|\alpha_{j-1}\|$, where $\alpha_j = \sum_{i=1}^{N_{SV}} \alpha_i x_i$ is computed using the third set of support vectors as $x_i$, and $\alpha_{j-1} = \sum_{i=1}^{N_{SV}} \alpha_i x_i$ is computed using the first set of support vectors as $x_i$. Prior to computing $c_{p\alpha}$, a value of $\alpha_{j-1}$ may be tested to determine if the value is zero. If so, $c_{p\alpha}$ may be set to a very large value.

In an operation 468, a determination is made concerning whether or not $c_{pR} \leq \epsilon_R$. $c_{pR} \leq \epsilon_R$ is a second stop condition. When $c_{pR} \leq \epsilon_R$, processing continues in an operation 470. When $c_{pR} > \epsilon_R$, processing continues in an operation 472.

In operation 470, a determination is made concerning whether or not $c_{p\alpha} \leq \epsilon_\alpha$. $c_{p\alpha} \leq \epsilon_\alpha$ is a third stop condition. When $c_{p\alpha} \leq \epsilon_\alpha$, processing continues in an operation 474. When $c_{p\alpha} > \epsilon_\alpha$, processing continues in operation 472.

In operation 472, the consecutive convergence counter k is reset to zero to indicate that convergence has not occurred, and processing continues in an operation 478.

In operation 474, the consecutive convergence counter k is incremented by adding one to the current value, and processing continues in an operation 476.

In operation 476, a determination is made concerning whether or not k≥t. When k≥t, processing continues in operation 464 to complete processing because convergence has occurred for the indicated number of consecutive iterations. When k<t, processing continues in operation 478. k≥t is a fourth stop condition.

In operation 478, the first set of support vectors is replaced with the third set of support vectors computed in operation 460.

In an operation 482, the iteration counter i is incremented by adding one to the current value, and processing continues in operation 434 shown referring to FIG. 4B to perform another iteration.

Referring to FIG. 5, a first example dataset 500 including a first dimension (variable) x1 and a second dimension (variable) x2 having a banana shape is shown for training dataset 124 in accordance with an illustrative embodiment. First example dataset 500 included 11,016 observations.

Figure 6:
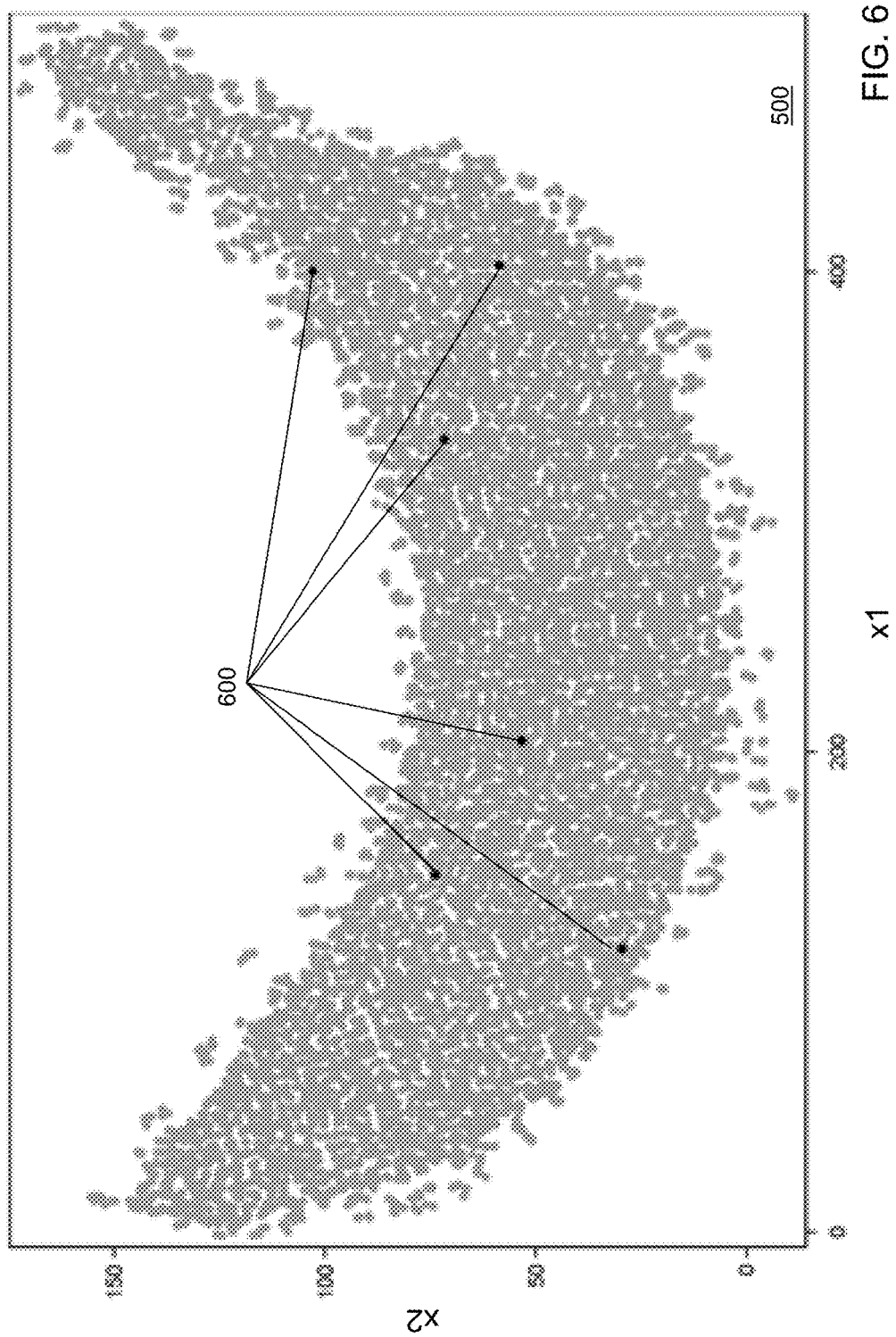
FIGS. 6-12 depict SVDD results using a Gaussian kernel function at different iterations of the operations of FIGS. 4A, 4B, and 4C using the first example dataset of FIG. 5 in accordance with an illustrative embodiment.

FIGS. 6-12 show the development of a final solution for first example dataset 500 using training application 122 and the operations of FIGS. 4A, 4B, and 4C with sample size $N_s$=4. The Gaussian kernel function was used with a value of s=50. The remaining parameters were: $\epsilon_\alpha = \epsilon_R = 1e-5$, M=1000, f=0.0001, q=1, and t=10. For example, FIG. 6 shows a plurality of support vectors 600 that are the third set of support vectors computed in operation 460 for i=1. The plurality of support vectors 600 are indicated by black dots, and the remaining observations of first example dataset 500 are shown with gray dots. The plurality of support vectors 600 includes six support vectors.

Figure 7:
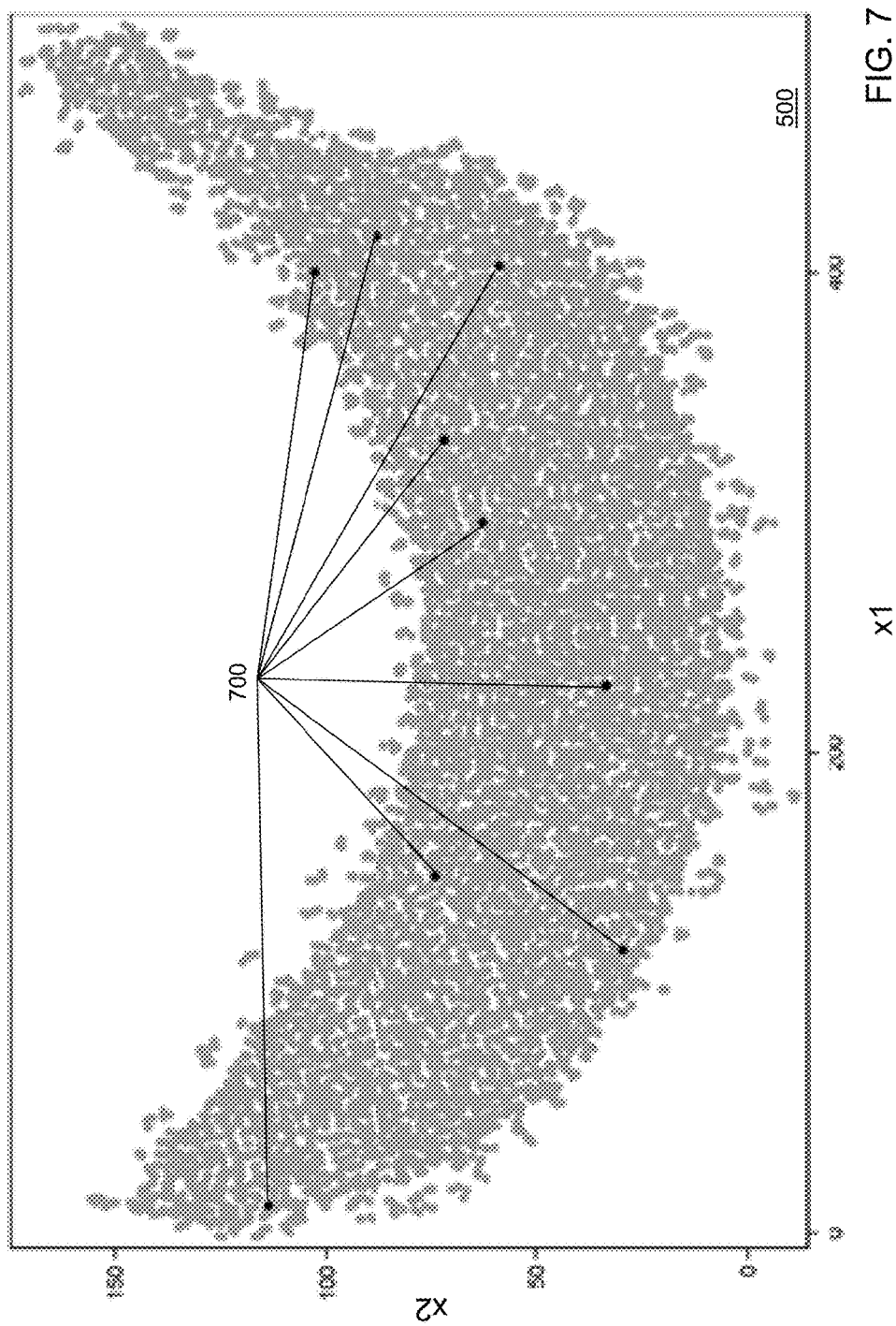

FIG. 7 shows a plurality of support vectors 700 that are the third set of support vectors computed in operation 460 for i=2. The plurality of support vectors 700 are again indicated by black dots. The plurality of support vectors 700 includes nine support vectors.

Figure 8:
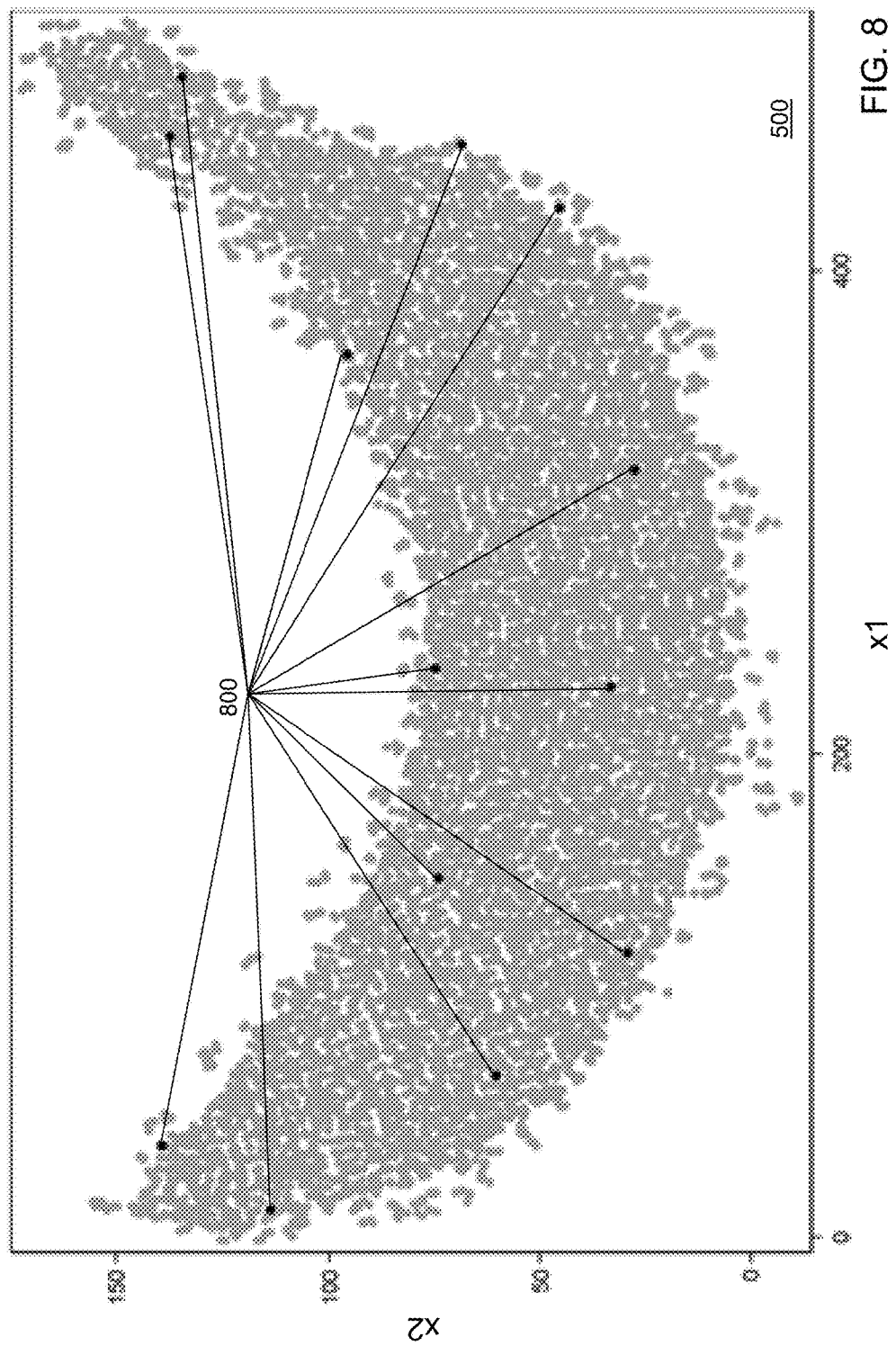

FIG. 8 shows a plurality of support vectors 800 that are the third set of support vectors computed in operation 460 for i=10. The plurality of support vectors 800 are again indicated by black dots. The plurality of support vectors 800 includes thirteen support vectors.

Figure 9:
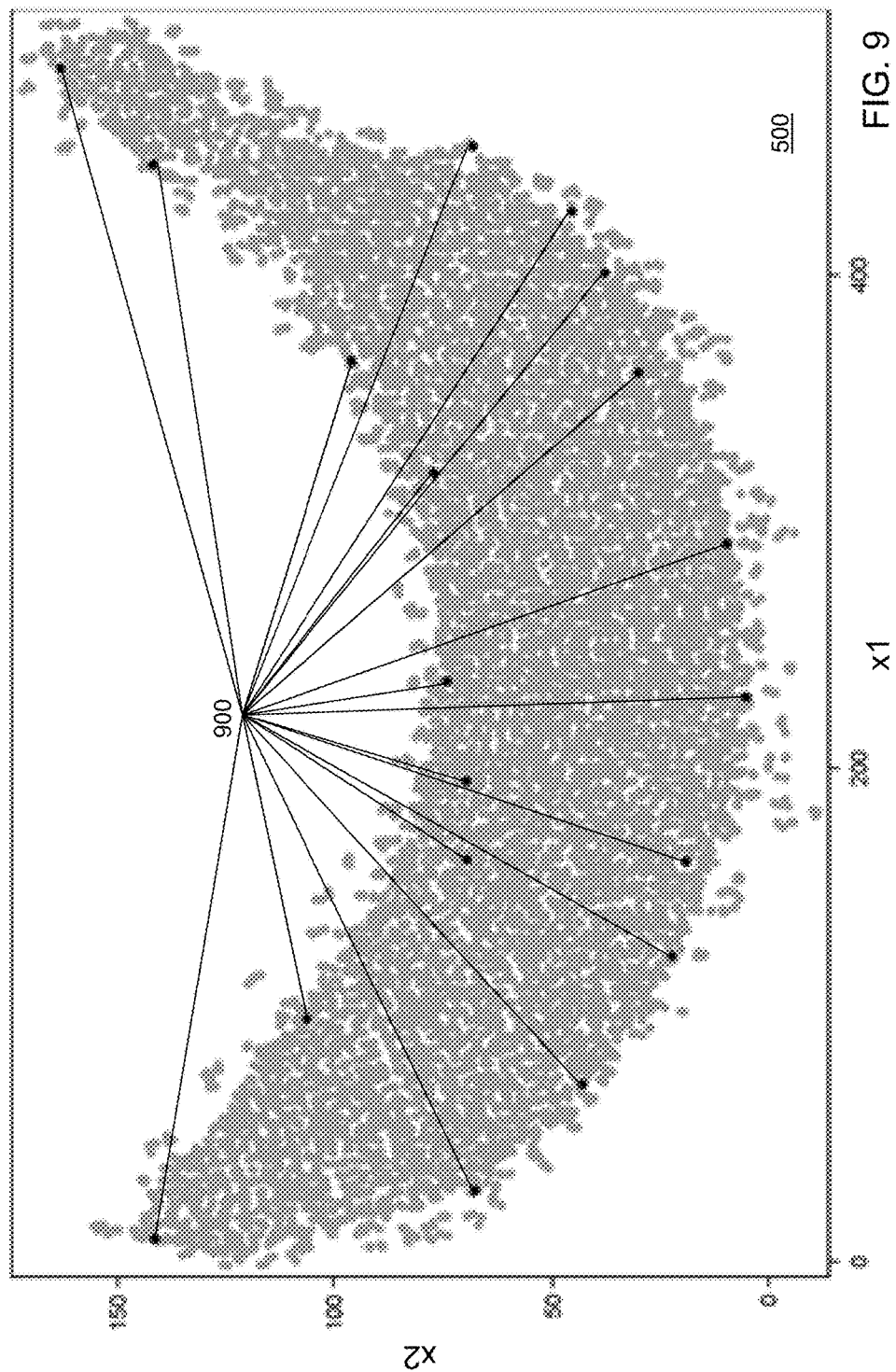

FIG. 9 shows a plurality of support vectors 900 that are the third set of support vectors computed in operation 460 for i=30. The plurality of support vectors 900 are again indicated by black dots. The plurality of support vectors 900 includes nineteen support vectors.

Figure 10:
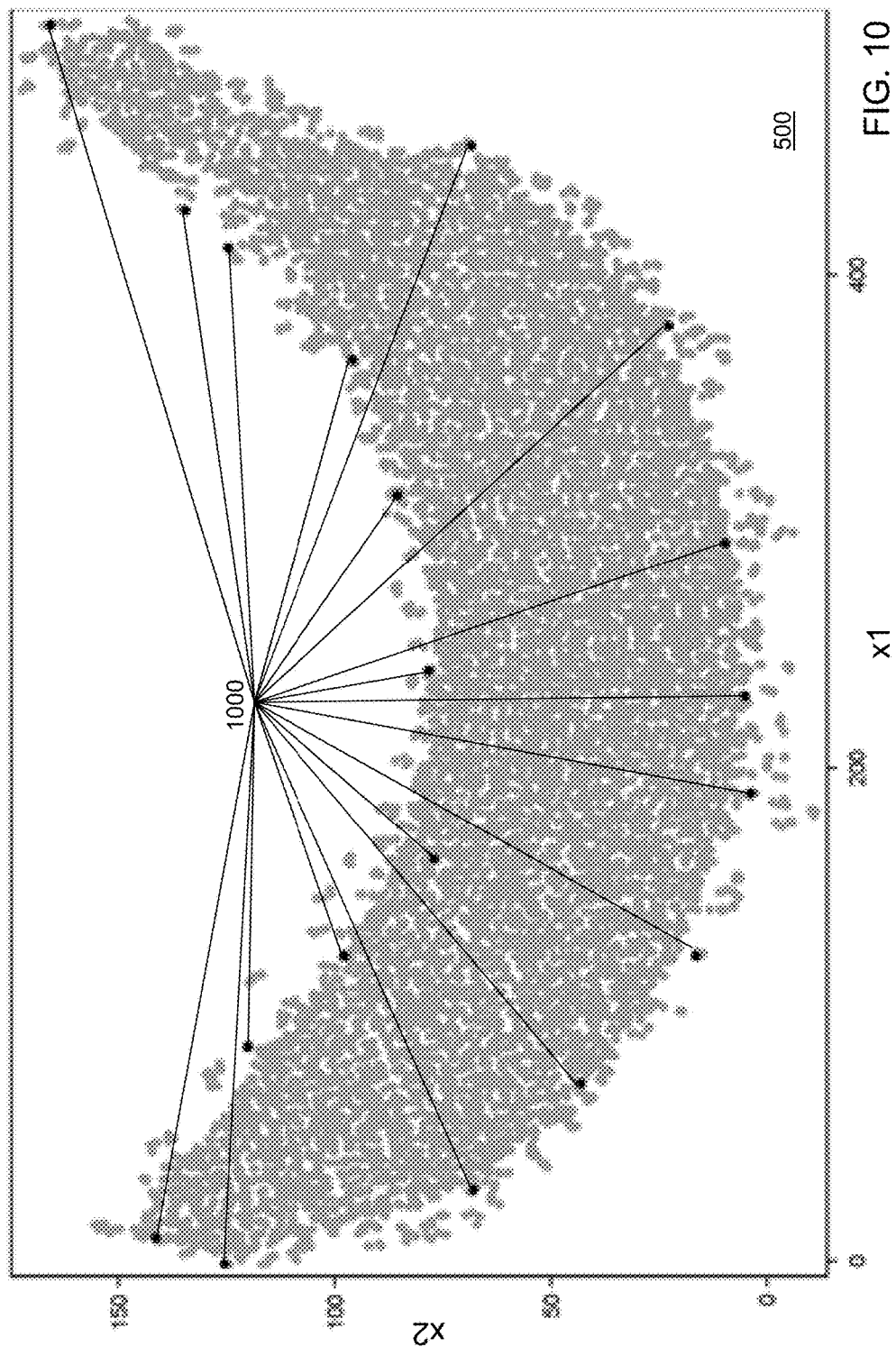

FIG. 10 shows a plurality of support vectors 1000 that are the third set of support vectors computed in operation 460 for i=70. The plurality of support vectors 1000 are again indicated by black dots. The plurality of support vectors 1000 includes nineteen support vectors.

Figure 11:
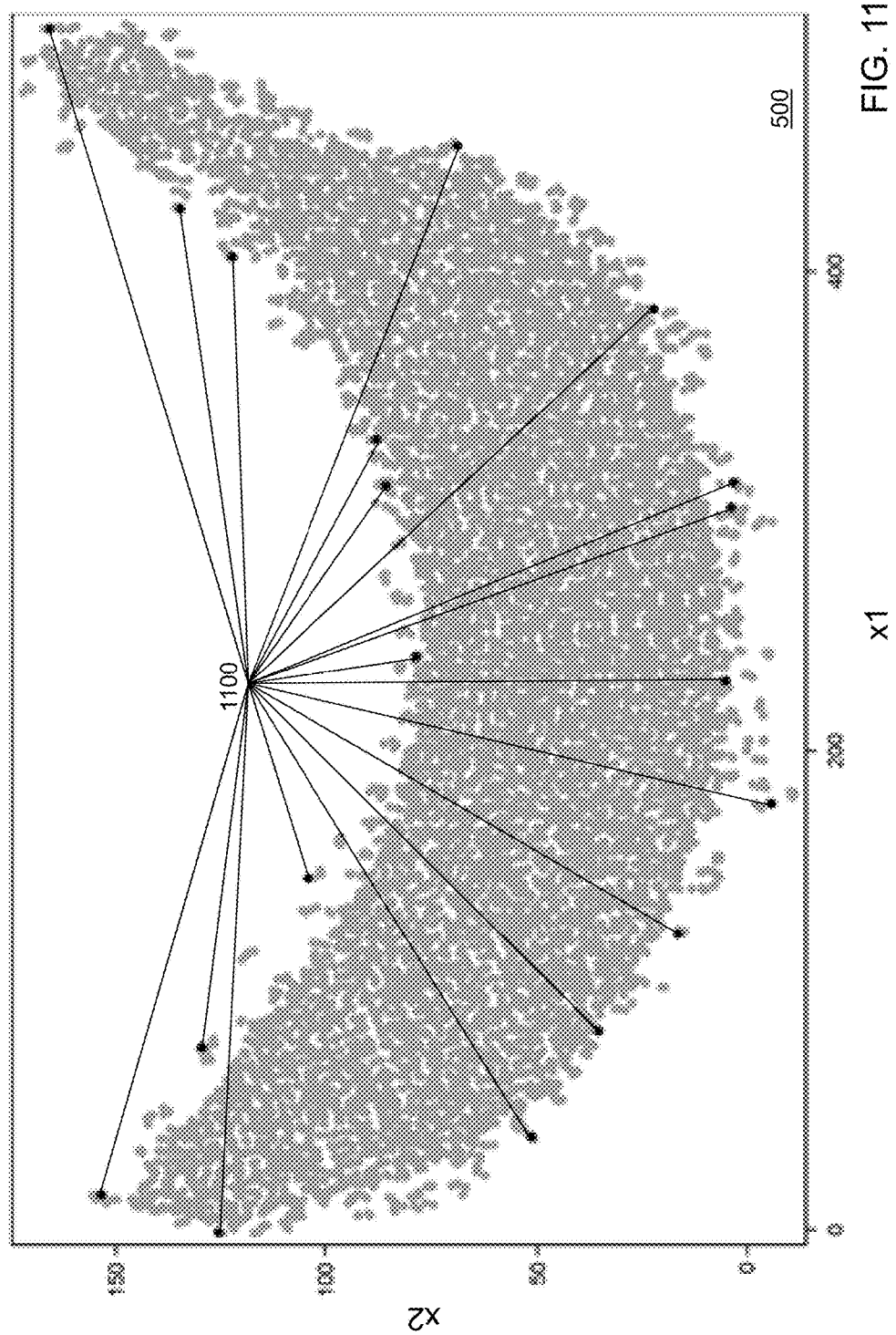

FIG. 11 shows a plurality of support vectors 1100 that are the third set of support vectors computed in operation 460 for i=140. The plurality of support vectors 1100 are again indicated by black dots. The plurality of support vectors 1100 includes nineteen support vectors.

Figure 12:
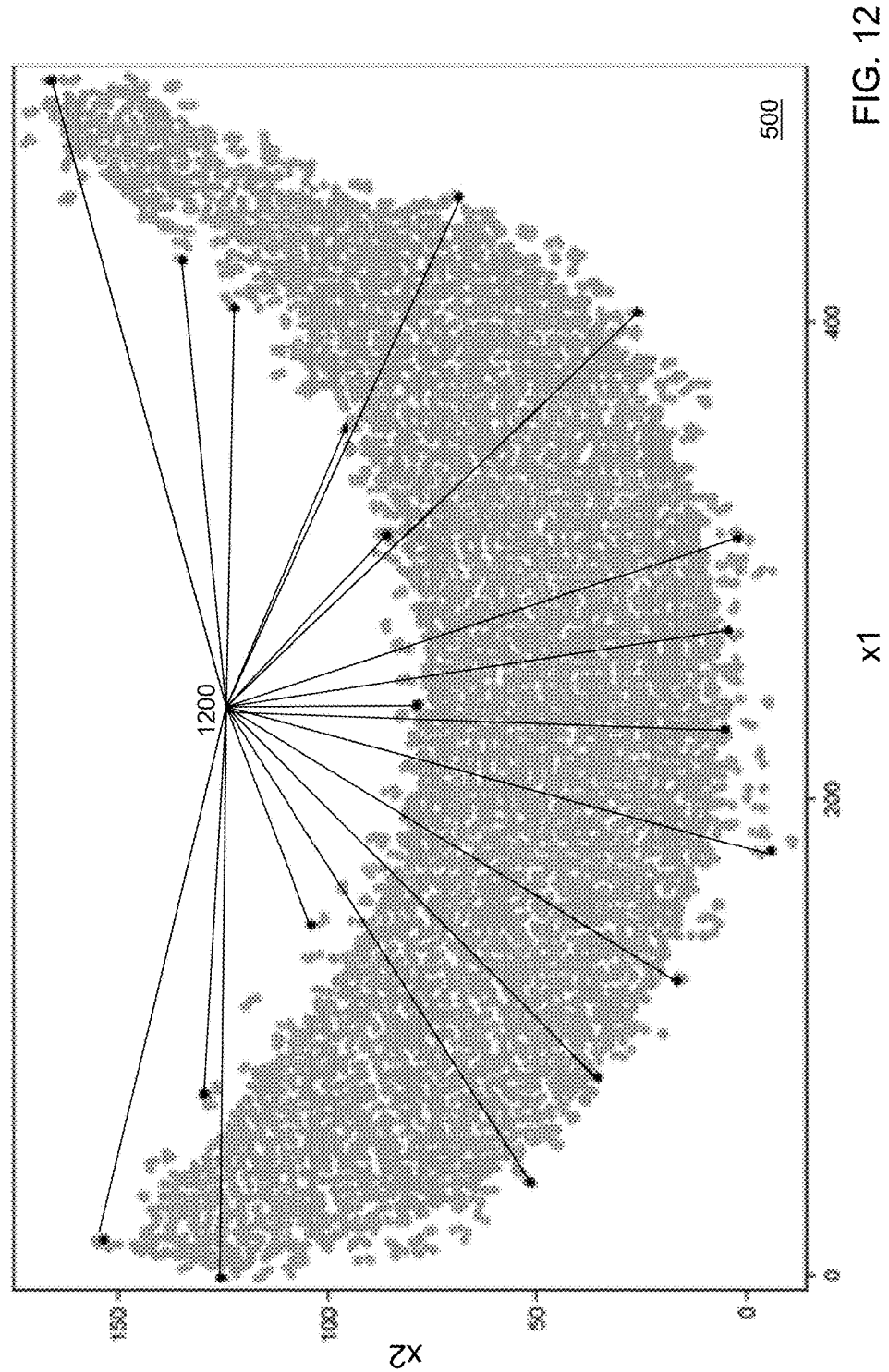

FIG. 12 shows a plurality of support vectors 1200 that are the third set of support vectors computed in operation 460 for i=170. The plurality of support vectors 1200 are again indicated by black dots. The plurality of support vectors 1200 includes nineteen support vectors.

As illustrated by FIGS. 6-12, at lower iteration numbers, the plurality of support vectors were in the interior of first example dataset 500. As the number of iterations increased, the operations of training application 122 moved the plurality of support vectors toward the data description. At and near convergence, the plurality of support vectors were primarily along the data description.

Figure 13:
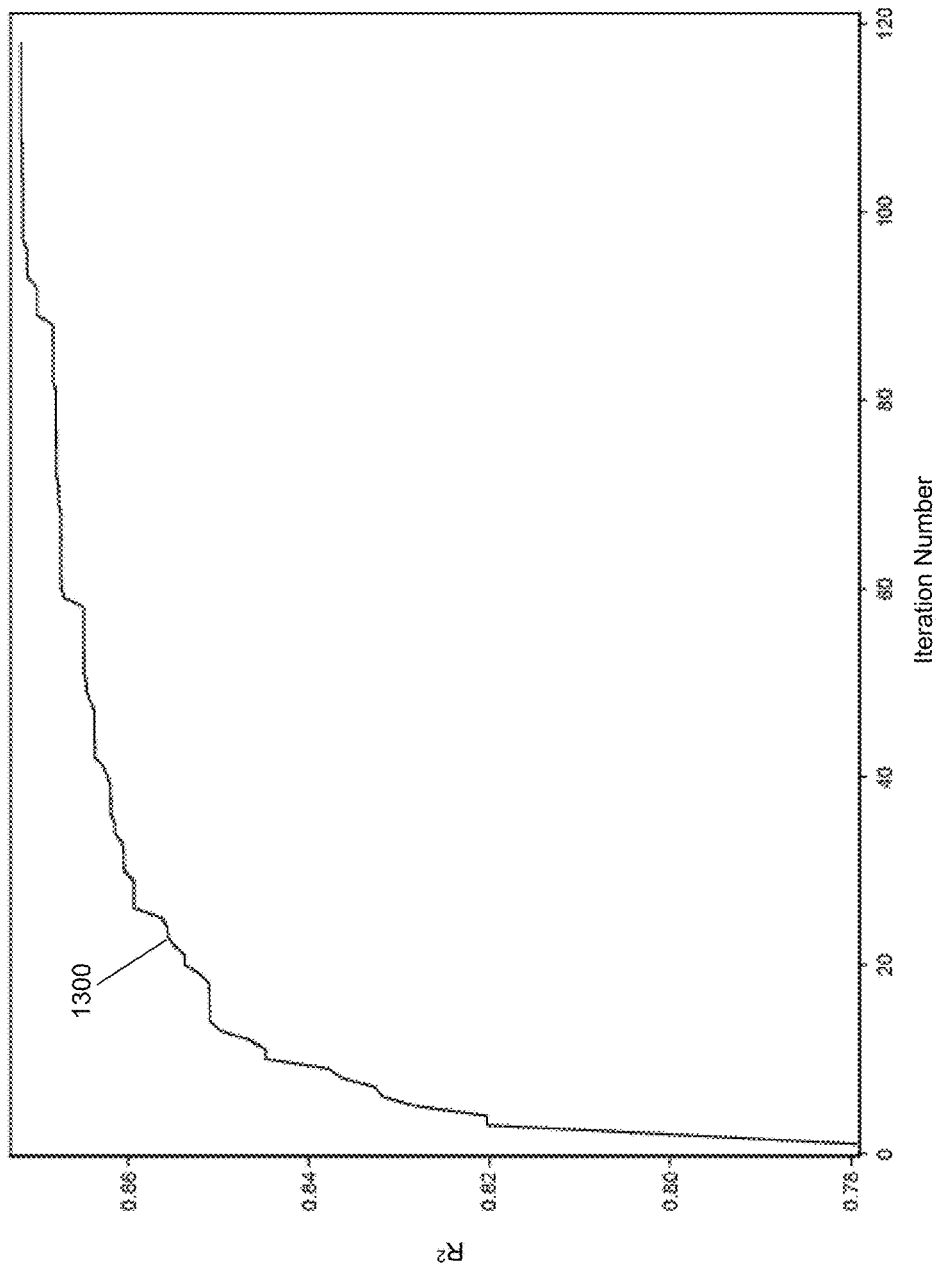
FIG. 13 depicts a value of a threshold $R^2$ as a function of an iteration number of the operations of FIGS. 4A, 4B, and 4C using the first example dataset of FIG. 5 in accordance with an illustrative embodiment.

Referring to FIG. 13, an $R^2$ curve 1300 shows a variation in $R^2$ computed using the third set of support vectors computed in operation 460 in successive iterations of operation 460 from i=1 to i=120.

For comparison, an SVDD' was computed using all of the observations in first example dataset 500. After solving for the optimal solution using all of the observations in first example dataset 500, SVDD' included 21 support vectors and resulted in $R^2$=0.8789 and required 1.98 seconds of computing time. In comparison, SVDD 126 included 19 support vectors and resulted in $R^2$=0.872 and required only 0.32 seconds of computing time for $N_s$=6.

Figure 14:
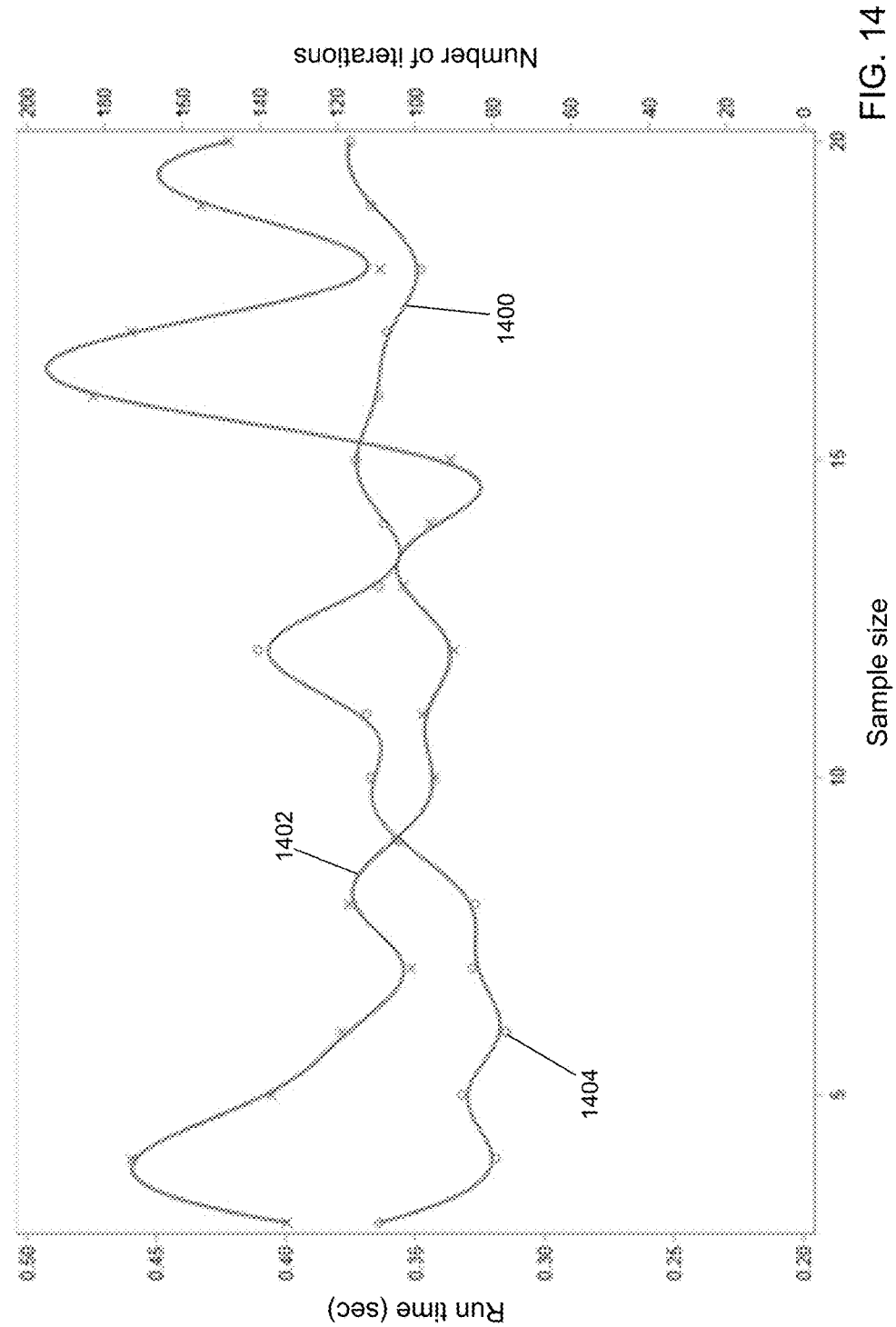
FIG. 14 depicts a value of a run time and a number of iterations as a function of a sample size for the operations of FIGS. 4A, 4B, and 4C using the first example dataset of FIG. 5 in accordance with an illustrative embodiment.

Referring to FIG. 14, a run time curve 1400 and a number of iterations curve 1402 are shown as a function of sample size $N_s$, which ranged from 3 to 20. Run time curve 1400 and number of iterations curve 1402 are b-spline curve fits to the data points for each sample size $N_s$. For example, run time curve data points are shown with open circles, and number of iterations curve data points are shown with an "x". A minimum run time data point 1404 indicates a minimum run time occurred for $N_s$=6.

Figure 15:
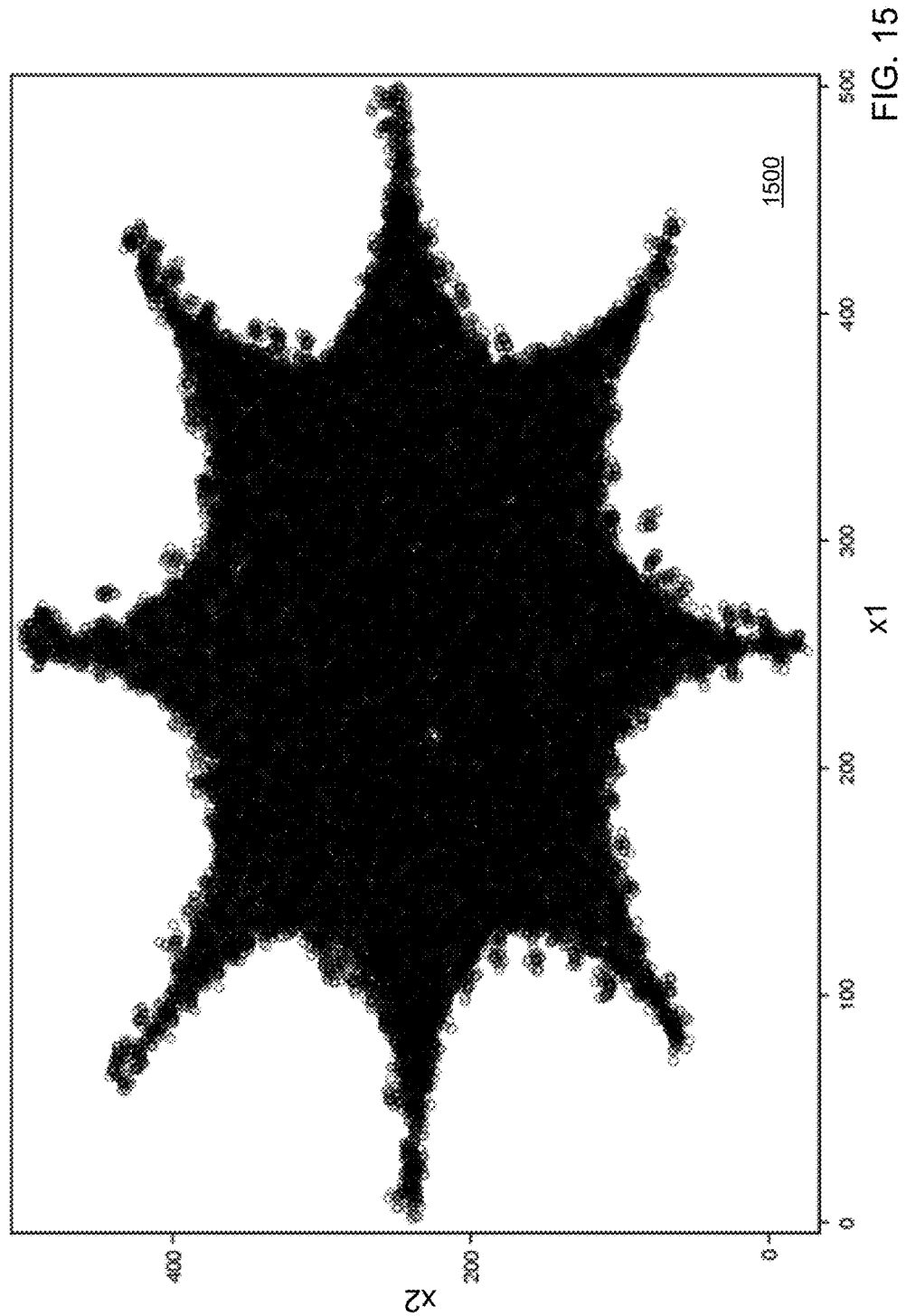
FIG. 15 depicts a second example dataset having a star shape in accordance with an illustrative embodiment.

Referring to FIG. 15, a second example dataset 1500 including a first dimension (variable) x1 and a second dimension (variable) x2 having a star shape is shown for training dataset 124 in accordance with an illustrative embodiment. Second example dataset 1500 included 64,000 observations. The Gaussian kernel function was used with a value of s=52. The remaining parameters were: $\epsilon_\alpha=\epsilon_R$=1e-5, M=1000, f=0.0001, q=1, and t=10.

Figure 16:
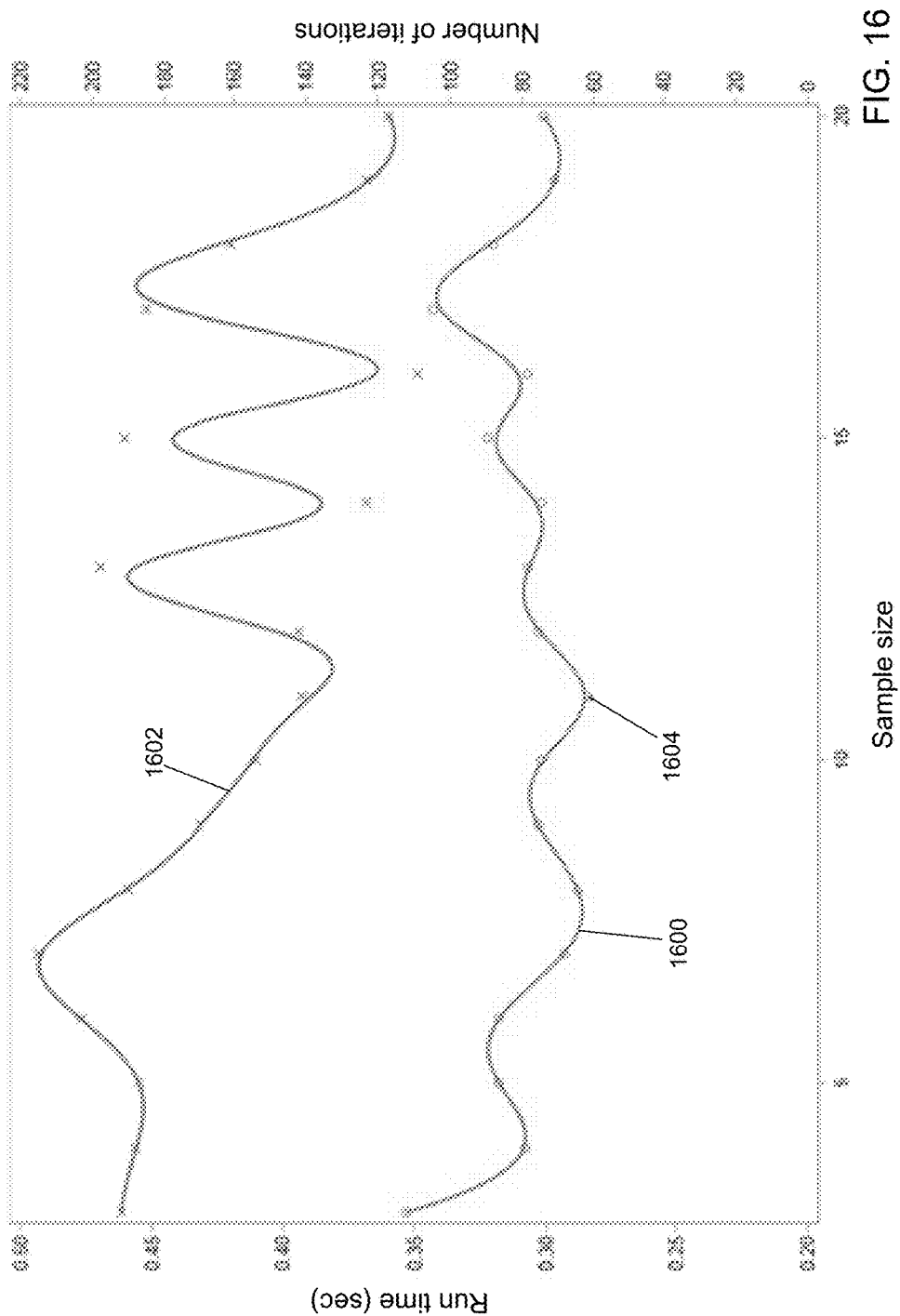
FIG. 16 depicts a value of a run time and a number of iterations as a function of a sample size for the operations of FIGS. 4A, 4B, and 4C using the second example dataset of FIG. 15 in accordance with an illustrative embodiment.

Referring to FIG. 16, a run time curve 1600 and a number of iterations curve 1602 are shown as a function of sample size $N_s$, which ranged from 3 to 20. Run time curve 1600 and number of iterations curve 1602 are b-spline curve fits to the data points for each sample size $N_s$. For example, run time curve data points are shown with open circles, and number of iterations curve data points are shown with an "x". A minimum run time data point 1604 indicates a minimum run time occurred for $N_s$=11.

For comparison, an SVDD' was computed using all of the observations in second example dataset 1500. SVDD' included 76 support vectors and resulted in $R^2$=0.9362 and required 11.55 seconds of computing time. In comparison, SVDD 126 computed using training application 122 with $N_s$=11 included 44 support vectors and resulted in $R^2$=0.932 and required 0.28 seconds of computing time.

Figure 17:
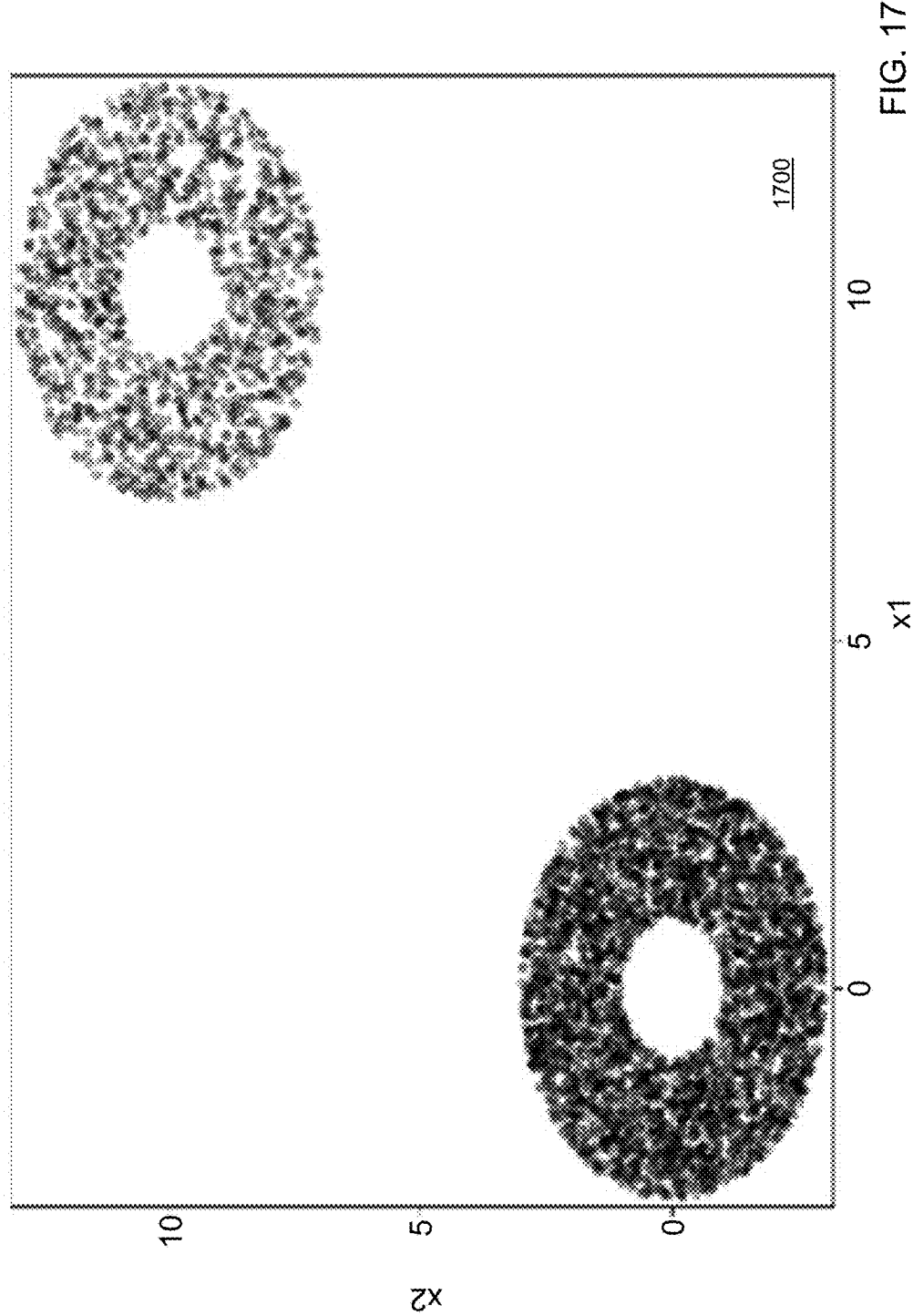
FIG. 17 depicts a third example dataset having a two-donut shape in accordance with an illustrative embodiment.

Referring to FIG. 17, a third example dataset 1700 including a first dimension (variable) x1 and a second dimension (variable) x2 having a two-donut shape is shown for training dataset 124 in accordance with an illustrative embodiment. Second example dataset 1500 included 1,333,334 observations. The Gaussian kernel function was used with a value of s=1.5. The remaining parameters were: $\epsilon_\alpha=\epsilon_R$=1e-5, M=1000, f=0.0001, q=1, and t=10.

Figure 18:
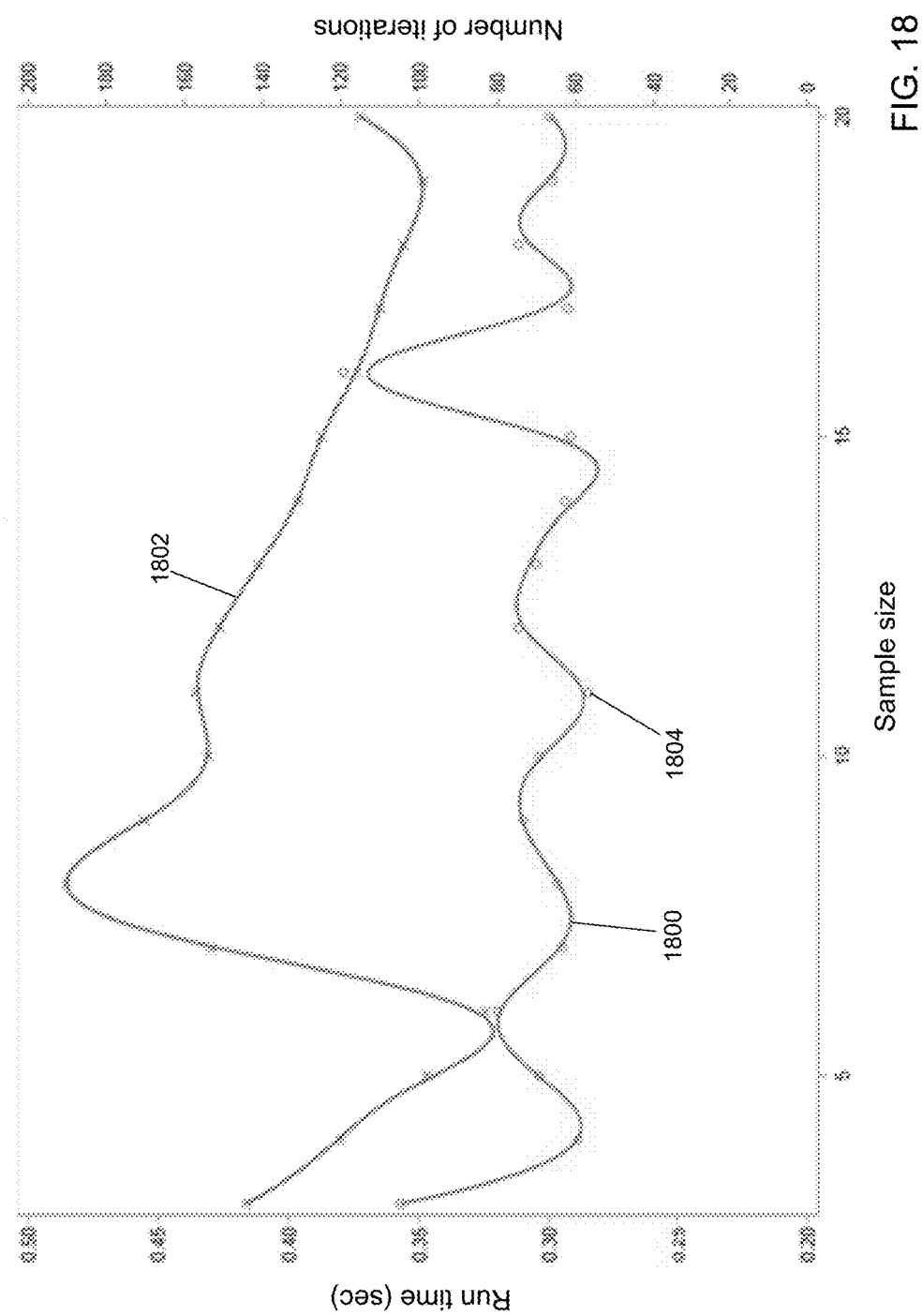
FIG. 18 depicts a value of a run time and a number of iterations as a function of a sample size for the operations of FIGS. 4A, 4B, and 4C using the third example dataset of FIG. 17 in accordance with an illustrative embodiment.

Referring to FIG. 18, a run time curve 1800 and a number of iterations curve 1802 are shown as a function of sample size $N_s$, which ranged from 3 to 20. Run time curve 1800 and number of iterations curve 1802 are b-spline curve fits to the data points for each sample size N. For example, run time curve data points are shown with open circles, and the number of iterations curve data points are shown with an "x". A minimum run time data point 1804 indicates a minimum run time occurred for $N_s$=11.

For comparison, an SVDD' was computed using all of the observations in third example dataset 1700. SVDD' included 178 support vectors and resulted in $R^2$=0.8982 and required 32 minutes of computing time. In comparison, SVDD 126 computed using training application 122 with $N_s$=11 included 37 support vectors and resulted in $R^2$=0.897 and required 0.29 seconds of computing time.

Figure 19:
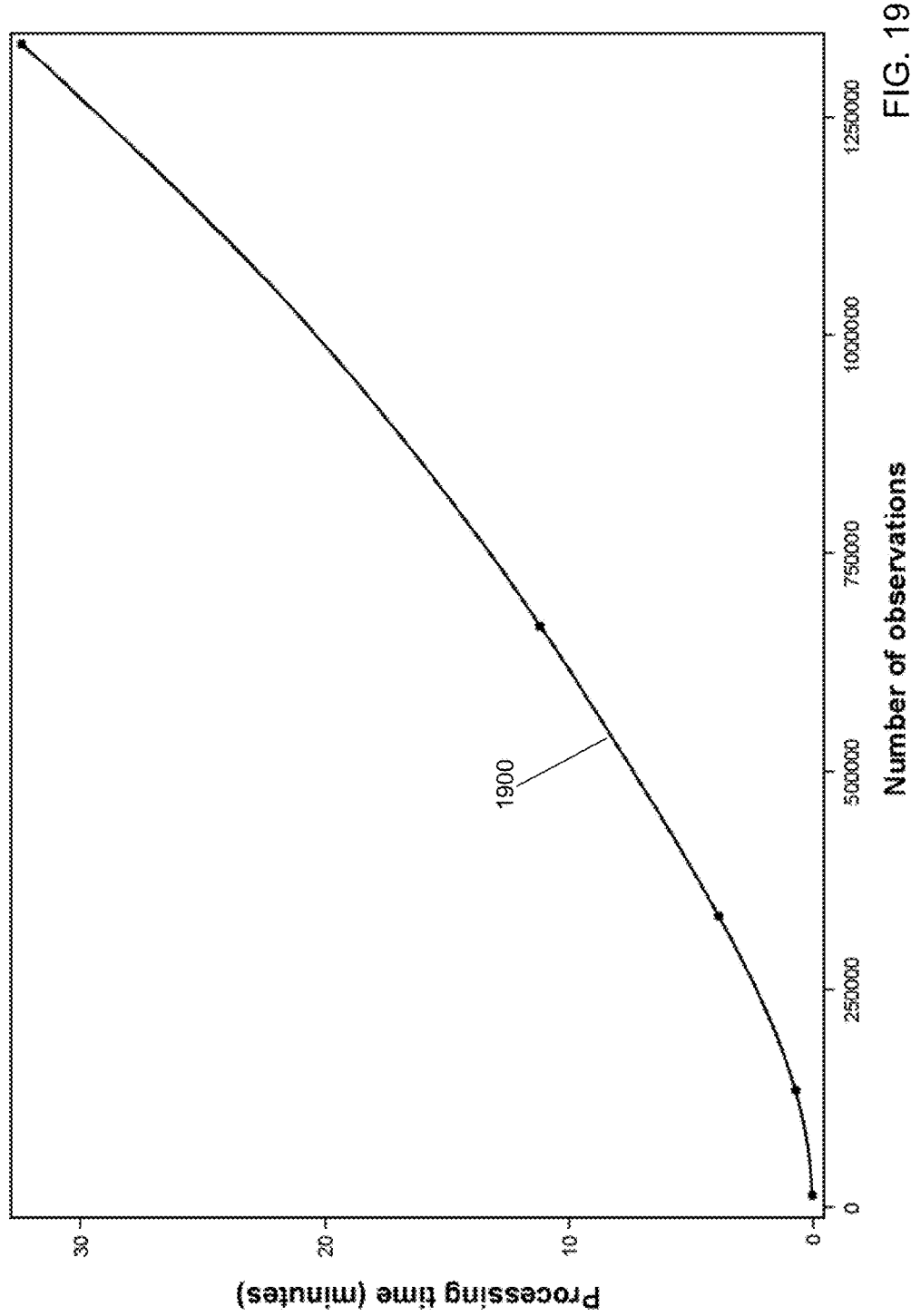
FIG. 19 depicts a value of a processing time as a function of a number of observations in a training dataset selected from the third example dataset of FIG. 17 using the full SVDD method (solving for the SVDD using the entire selected training dataset in one iteration) in accordance with an illustrative embodiment.

Referring to FIG. 19, a processing time curve 1900 shows a processing (run) time as a function of a number of observations in training dataset 124 selected from third example dataset 1700 to compute SVDD'. The processing time has an exponential shape as a function of a number of observations used to compute SVDD'. The training time for SVDD' is low for small or moderately sized training datasets of size up to 15,000 observations, but is prohibitively high for large datasets.

Figure 20:
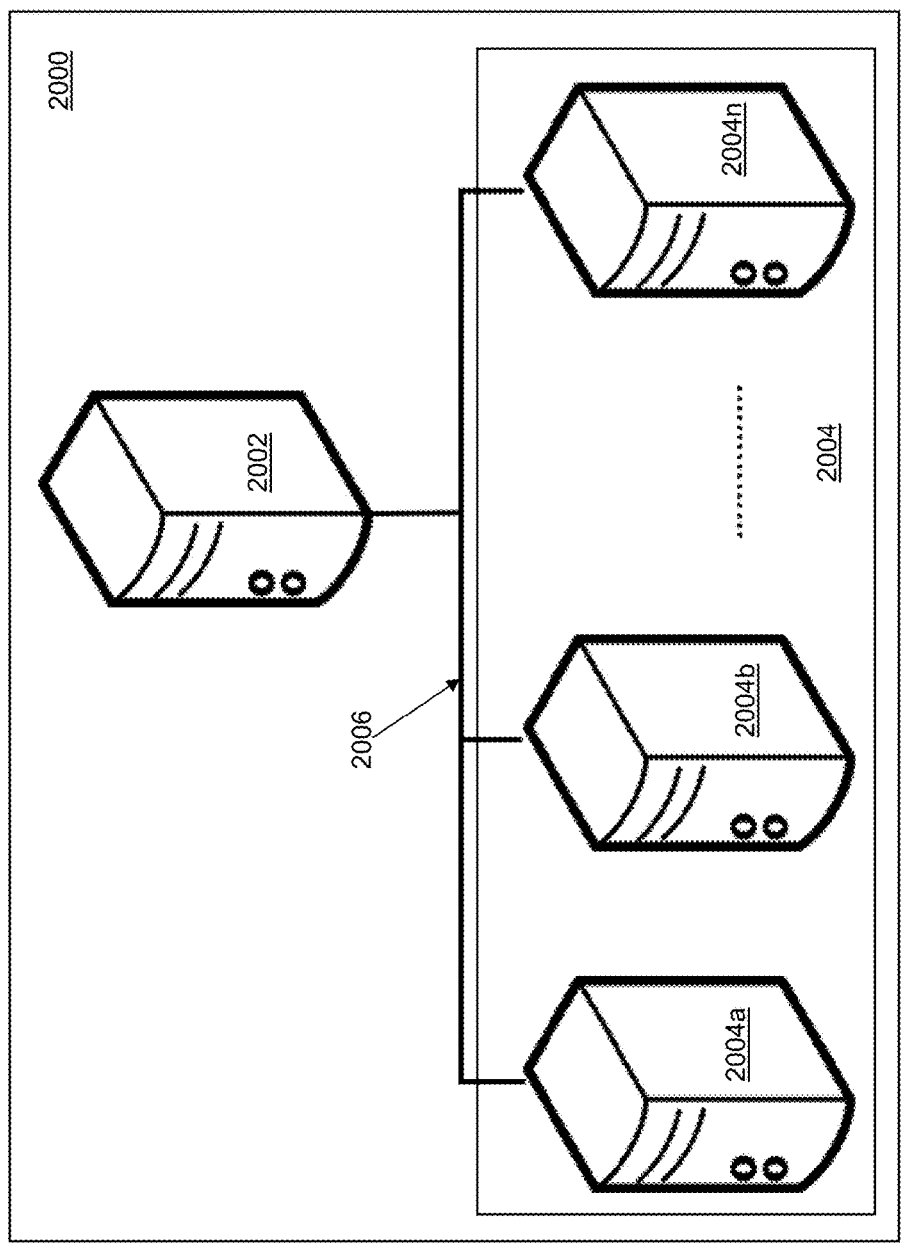
FIG. 20 depicts a block diagram of an SVDD training system in accordance with an illustrative embodiment.

For extremely large training datasets, efficiency gains can be realized using a distributed implementation. Referring to FIG. 20, a block diagram of an SVDD training system 2000 is shown in accordance with an illustrative embodiment. In an illustrative embodiment, SVDD training system 2000 may include a controller device 2002, one or more worker devices 2004, and a network 2006. For illustration, the one or more worker devices 2004 may include a first worker device 2004a, a second worker device 2004b, . . . , and an nth worker device 2004n. Controller device 2002 and the one or more worker devices 2004 are in communication through network 2006.

Network 2006 may include one or more networks of the same or different types. Network 2006 can be any type of wired and/or wireless public or private network including a cellular network, a local area network, a wide area network such as the Internet or the World Wide Web, etc. Network 2006 further may comprise sub-networks and consist of any number of communication devices.

Controller device 2002 and the one or more worker devices 2004 may include computers of any form factor such as a server computer, a desktop, a smart phone, a laptop, a personal digital assistant, an integrated messaging device, a tablet computer, etc. For illustration, controller device 2002 and the one or more worker devices 2004 are each an instance of SVDD training device 100. Training dataset 124 with $M_s$ observations is distributed across p worker devices 2004. Each worker device computes SVDD 126 for its $M_s/p$ observations using training application 122 to determine its own plurality of support vectors $SV_i^*$, where i indicates the worker device. Once SVDD computations are completed, each worker device sends its plurality of support vectors $SV_i^*$ to controller device 2002. The controller device 2002 forms a union of all the worker device support vectors $SV_i^*$ as $S'=\cup_{i=1}^{P}SV_i^*$ to create data set S'. An optimal value for the objective function is computed by optimizing the objective function using the kernel function defined based on the fourth indicator and the dataset S'. For example, equations (10)-(13) above are used to solve for SV, a final plurality of support vectors that have $0<\alpha_i \leq C$, along with values for the Lagrange constants $\alpha_i$ for each support vector of the final plurality of support vectors, the center position α, and R². The final plurality of support vectors computed by controller device 2002 along with values for the Lagrange constants $\alpha_i$ for each support vector of the final plurality of support vectors, the center position α, and R² may be stored as SVDD 126.

Figure 21:
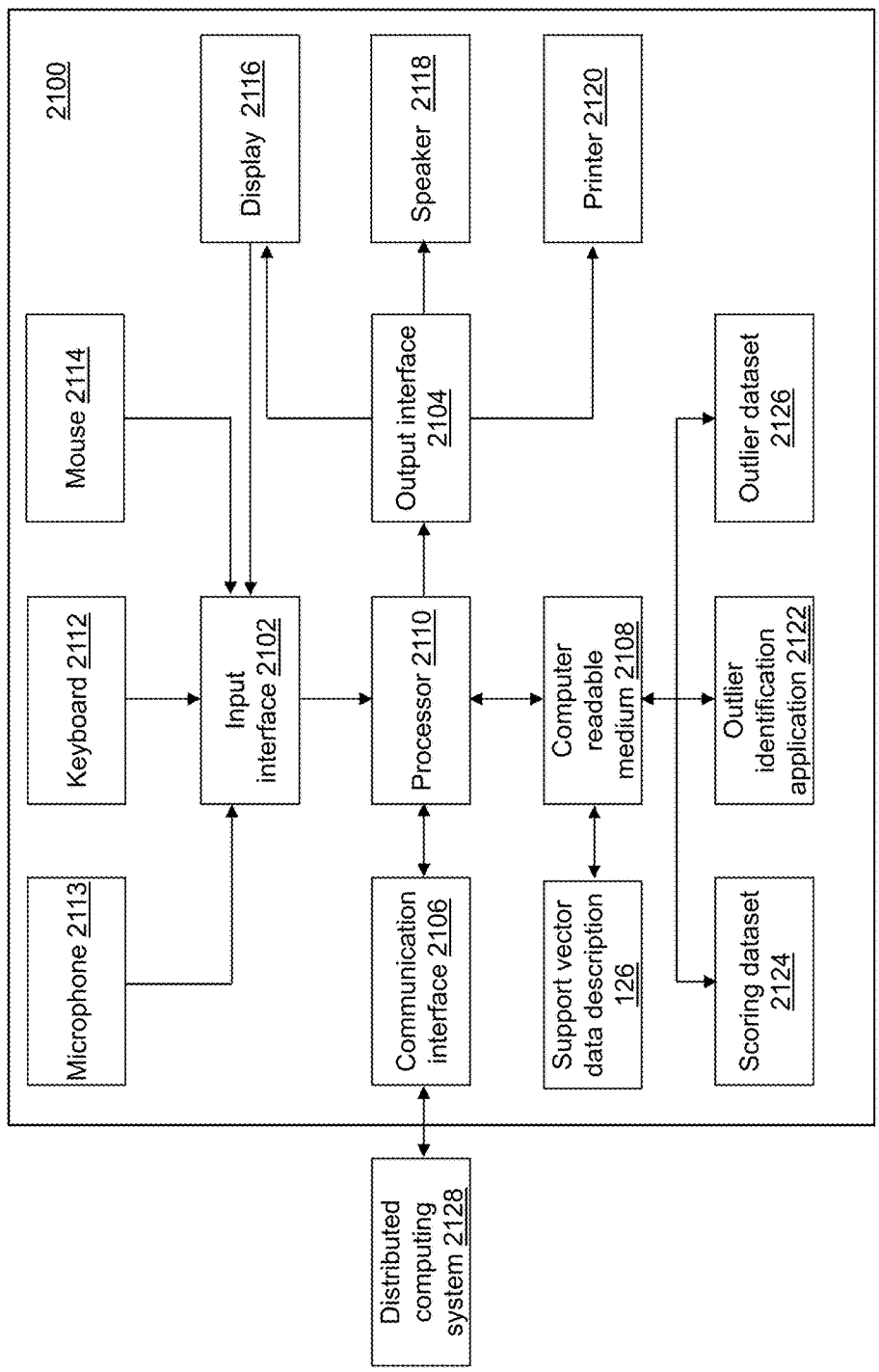
FIG. 21 depicts a block diagram of an outlier identification device in accordance with an illustrative embodiment.

Referring to FIG. 21, a block diagram of an outlier identification device 2100 is shown in accordance with an illustrative embodiment. Outlier identification device 2100 may include a second input interface 2102, a second output interface 2104, a communication interface 2106, a second non-transitory computer-readable medium 2108, a second processor 2110, an outlier identification application 2122, SVDD 126, a scoring dataset 2124, and an outlier dataset 2126. Fewer, different, and/or additional components may be incorporated into outlier identification device 2100. Outlier identification device 2100 and SVDD training device 100 may be the same or different devices.

Second input interface 2102 provides the same or similar functionality as that described with reference to input interface 102 of SVDD training device 100 though referring to outlier identification device 2100. Second output interface 2104 provides the same or similar functionality as that described with reference to output interface 104 of SVDD training device 100 though referring to outlier identification device 2100. Second communication interface 2106 provides the same or similar functionality as that described with reference to communication interface 106 of SVDD training device 100 though referring to outlier identification device 2100. Data and messages may be transferred between outlier identification device 2100 and a distributed computing system 2128 using second communication interface 2106. Second computer-readable medium 2108 provides the same or similar functionality as that described with reference to computer-readable medium 108 of SVDD training device 100 though referring to outlier identification device 2100. Second processor 2110 provides the same or similar functionality as that described with reference to processor 110 of SVDD training device 100 though referring to outlier identification device 2100.

Outlier identification application 2122 performs operations associated with creating outlier dataset 2126 from data stored in scoring dataset 2124 using SVDD 126. SVDD 126 may be used to classify data stored in scoring dataset 2124 and to identify outliers in scoring dataset 2124 that are stored in outlier dataset 2126 to support various data analysis functions as well as provide alert/messaging related to the identified outliers stored in outlier dataset 2126. Dependent on the type of data stored in training dataset 124 and scoring dataset 2124, outlier dataset 2126 may identify anomalies as part of process control, for example, of a manufacturing process, for machine condition monitoring, for example, an electro-cardiogram device, for image classification, for intrusion detection, for fraud detection, etc. Some or all of the operations described herein may be embodied in outlier identification application 2122. The operations may be implemented using hardware, firmware, software, or any combination of these methods.

Referring to the example embodiment of FIG. 21, outlier identification application 2122 is implemented in software (comprised of computer-readable and/or computer-executable instructions) stored in second computer-readable medium 2108 and accessible by second processor 2110 for execution of the instructions that embody the operations of training application 122. Outlier identification application 2122 may be written using one or more programming languages, assembly languages, scripting languages, etc. Outlier identification application 2122 may be integrated with other analytic tools. For example, outlier identification application 2122 may be part of SAS® Enterprise Miner™ developed and provided by SAS Institute Inc. of Cary, N.C. that may be used to create highly accurate predictive and descriptive models based on analysis of vast amounts of data from across an enterprise. Data mining is applicable in a variety of industries.

Outlier identification application 2122 may be implemented as a Web application. Outlier identification application 2122 may be integrated with other system processing tools to automatically process data generated as part of operation of an enterprise, to identify any outliers in the processed data, and to provide a warning or alert associated with the outlier identification using second input interface 2102, second output interface 2104, and/or second communication interface 2106 so that appropriate action can be initiated in response to the outlier identification. Outlier identification application 2122 and training application 122 further may be integrated applications.

Training dataset 124 and scoring dataset 2124 may be generated, stored, and accessed using the same or different mechanisms. Similar to training dataset 124, scoring dataset 2124 may include a plurality of rows and a plurality of columns with the plurality of rows referred to as observations or records, and the columns referred to as variables that are associated with an observation. Scoring dataset 2124 may be transposed.

Similar to training dataset 124, scoring dataset 2124 may be stored on second computer-readable medium 2108 or on one or more computer-readable media of distributed computing system 2128 and accessed by outlier identification device 2100 using second communication interface 2106. Data stored in scoring dataset 2124 may be a sensor measurement or a data communication value, may be generated or captured in response to occurrence of an event or a transaction, generated by a device such as in response to an interaction by a user with the device, etc. The data stored in scoring dataset 2124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in scoring dataset 2124 may be captured at different time points periodically, intermittently, when an event occurs, etc. One or more columns may include a time value. Similar to training dataset 124, data stored in scoring dataset 2124 may be generated as part of the IoT, and some or all data may be processed with an ESPE.

Similar to training dataset 124, scoring dataset 2124 may be stored in various compressed formats such as a coordinate format, a compressed sparse column format, a compressed sparse row format, etc. Scoring dataset 2124 further may be stored using various structures as known to those skilled in the art including a file system, a relational database, a system of tables, a structured query language database, etc. on SVDD training device 100, on outlier identification device 2100, and/or on distributed computing system 2128. Outlier identification device 2100 and/or distributed computing system 2128 may coordinate access to scoring dataset 2124 that is distributed across a plurality of computing devices. For example, scoring dataset 2124 may be stored in a cube distributed across a grid of computers as understood by a person of skill in the art. As another example, scoring dataset 2124 may be stored in a multi-node Hadoop® cluster. For instance, Apache™ Hadoop® is an open-source software framework for distributed computing supported by the Apache Software Foundation. As another example, scoring dataset 2124 may be stored in a cloud of computers and accessed using cloud computing technologies, as understood by a person of skill in the art. The SAS® LASR™ Analytic Server developed and provided by SAS Institute Inc. of Cary, N.C. may be used as an analytic platform to enable multiple users to concurrently access data stored in scoring dataset 2124.

Figure 22:
FIG. 22 depicts a flow diagram illustrating examples of operations performed by the outlier identification device of FIG. 21 in accordance with an illustrative embodiment.

Referring to FIG. 22, example operations of outlier identification application 2122 to use SVDD 126 to classify scoring dataset 2124 and create outlier dataset 2126 are described. The operations of FIGS. 4A, 4B, 4C, and 22 may be distributed between one or more applications that are integrated or that are independent.

In an operation 2200, a thirteenth indicator is received that indicates scoring dataset 2124. For example, the thirteenth indicator indicates a location and a name of scoring dataset 2124. As an example, the thirteenth indicator may be received by outlier identification application 2122 after selection from a user interface window or after entry by a user into a user interface window. In an alternative embodiment, scoring dataset 2124 may not be selectable. For example, a most recently created dataset may be used automatically.

In an operation 2202, a fourteenth indicator is received that indicates SVDD 126. For example, the fourteenth indicator indicates a location and a name of SVDD 126. As an example, the fourteenth indicator may be received by outlier identification application 2122 after selection from a user interface window or after entry by a user into a user interface window. In an alternative embodiment, SVDD 126 may not be selectable. For example, a default name and location for SVDD 126 may be used automatically.

In an operation 2204, a fifteenth indicator may be received that indicates a plurality of variables of scoring dataset 2124 to define observation vector z. The same set of the plurality of variables selected in operation 402 to define SVDD 126 should be selected. The fifteenth indicator may indicate that all or only a subset of the variables stored in scoring dataset 2124 be used to define SVDD 126. For example, the fifteenth indicator indicates a list of variables to use by name, column number, etc. In an alternative embodiment, the fifteenth indicator may not be received. For example, all of the variables may be used automatically.

Similar to operations 406 and 408, in an operation 2206, a sixteenth indicator of a kernel function and any kernel parameter value to apply may be received. The same kernel function and any kernel parameter value selected in operations 406 and 408 to define SVDD 126 should be selected. For example, the sixteenth indicator indicates a name of a kernel function. The sixteenth indicator may be received by outlier identification application 2122 after selection from a user interface window or after entry by a user into a user interface window. A default value for the kernel function may further be stored, for example, in second computer-readable medium 2108.

In an operation 2208, a seventeenth indicator is received that indicates outlier dataset 2126. For example, the seventeenth indicator indicates a location and a name of outlier dataset 2126. As an example, the seventeenth indicator may be received by outlier identification application 2122 after selection from a user interface window or after entry by a user into a user interface window. In an alternative embodiment, outlier dataset 2126 may not be selectable. For example, a default name and location for outlier dataset 2126 may be used automatically.

In an operation 2210, a first observation is selected as observation vector z from scoring dataset 2124.

In an operation 2212, a distance value for observation vector z is computed using SVDD 126 as $dist^2(z) = K(z,z) - 2\Sigma_{i=1}^{N_{SV}} \alpha_i K(x_i, z) + \Sigma_{i=1}^{N_{SV}} \alpha_i \alpha_j K(x_i, x_j)$. As discussed previously, some of the values may be constant and may have been saved with SVDD 126.

In an operation 2214, a determination is made concerning whether or not $dist^2(z) > R^2$, where $R^2$ may have been saved with SVDD 126. When $dist^2(z) > R^2$, processing continues in an operation 2216. When $dist^2(z) \leq R^2$, processing continues in an operation 2218.

In operation 2216, observation vector z and/or an indicator of observation vector z is stored to outlier dataset 2126, and processing continue in operation 2218.

In operation 2218, a determination is made concerning whether or not scoring dataset 2124 includes another observation. When scoring dataset 2124 includes another observation, processing continues in an operation 2220. When scoring dataset 2124 does not include another observation, processing continues in an operation 2222.

In operation 2220, a next observation is selected as observation vector z from scoring dataset 2124, and processing continues in operation 2212 to determine if the next observation is an outlier.

In operation 2222, scoring results are output. For example, statistical results associated with the scoring may be stored on one or more devices and/or on second computer-readable medium 2108 in a variety of formats as understood by a person of skill in the art. Outlier dataset 2126 and/or the scoring results further may be output to a second display 2116, to a second printer 2120, etc. In an illustrative embodiment, an alert message may be sent to another device using second communication interface 2106, printed on second printer 2120 or another printer, presented visually on second display 2116 or another display, presented audibly using a second speaker 2118 or another speaker when an outlier is identified.

Figure 23:
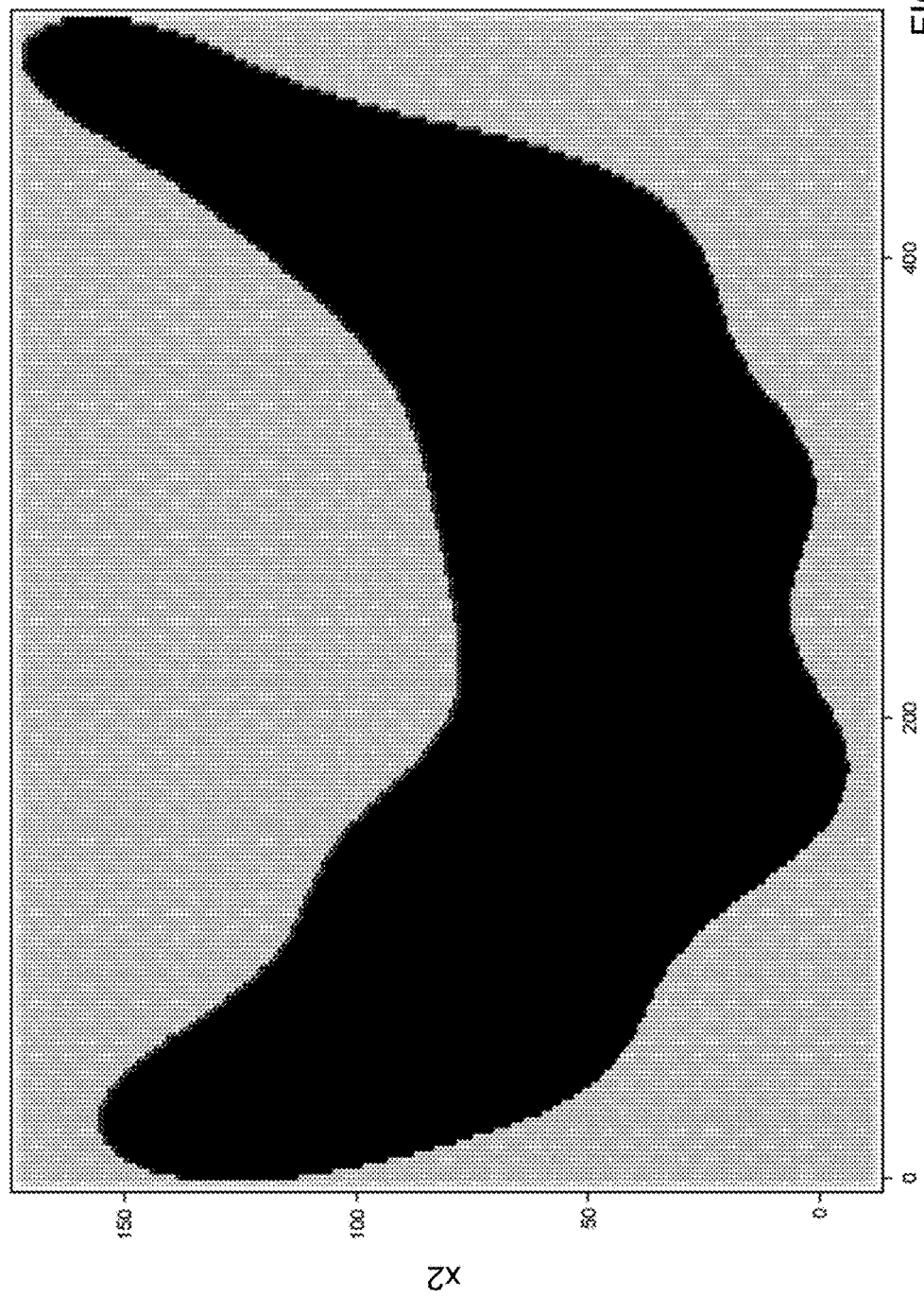
FIG. 23 depicts scoring results using the SVDD defined using the operations of FIGS. 4A, 4B, 4C, and 22 with the first example dataset of FIG. 5 in accordance with an illustrative embodiment.
Figure 24:
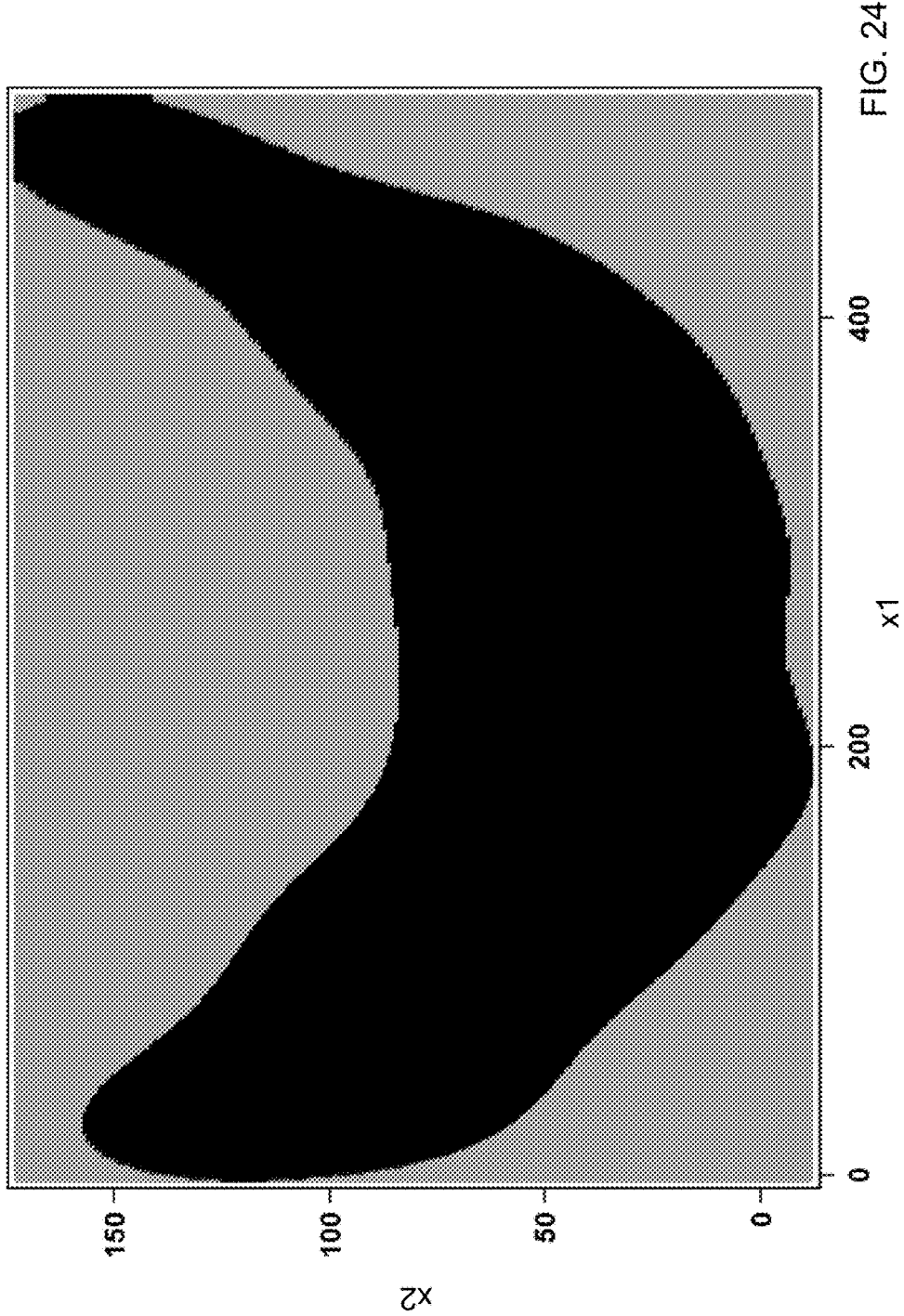
FIG. 24 depicts scoring results using an SVDD defined using the first example dataset of FIG. 5 in accordance with an illustrative embodiment.

To confirm that the data description defined by SVDD 126 using the sampling method performed by training application 122 is similar to SVDD' computed using the entirety of training dataset 124 to train in a single iteration, scoring was performed using a 200×200 data grid. FIG. 23 depicts scoring results using SVDD 126 computed using the operations of FIGS. 4A, 4B, 4C, and 22 with first example dataset 500 as training dataset 124. FIG. 24 depicts scoring results using SVDD' computed by training using the entirety of first example dataset 500 as training dataset 124 in a single iteration.

Figure 25:
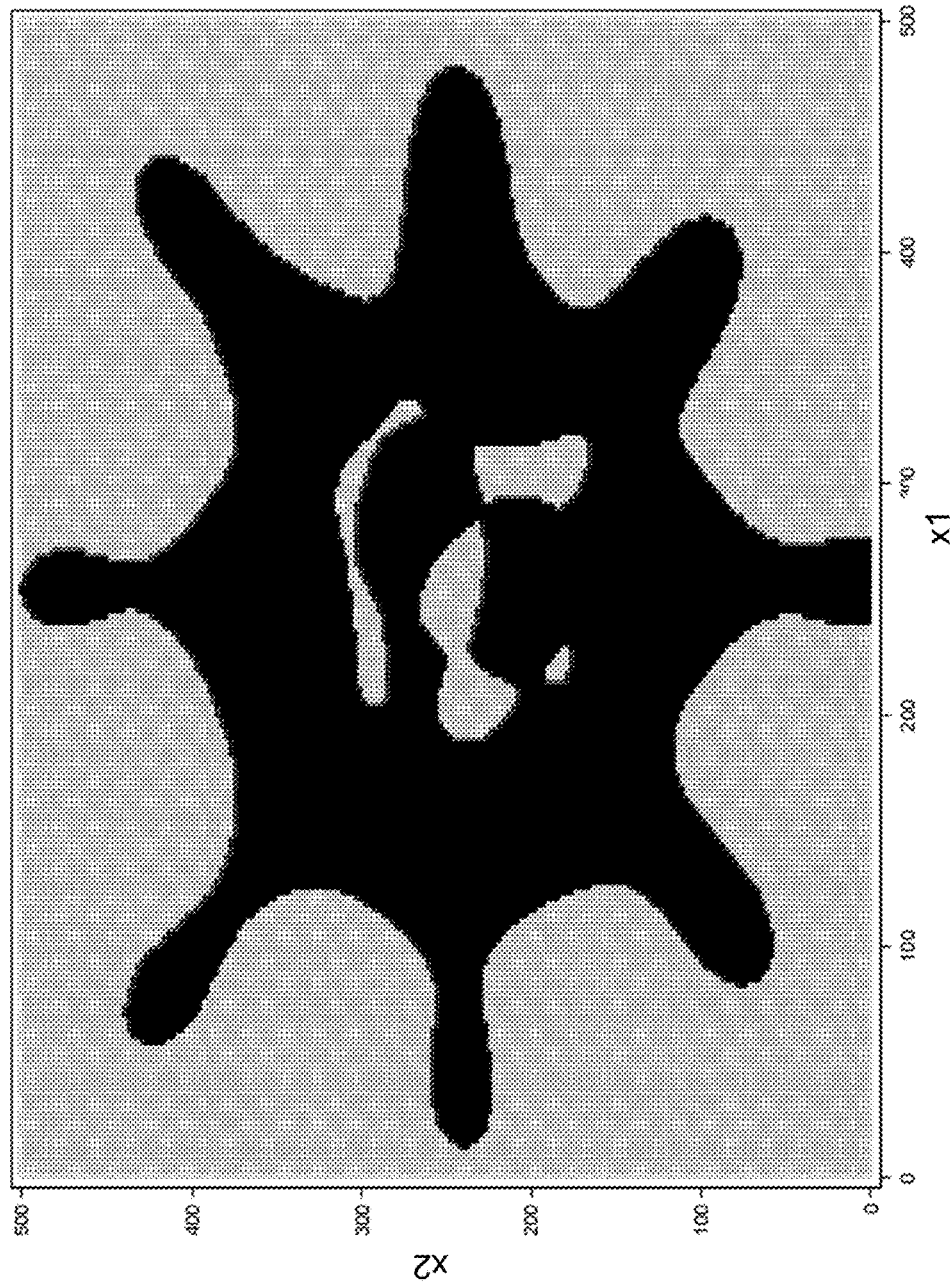
FIG. 25 depicts scoring results using the SVDD defined using the operations of FIGS. 4A, 4B, 4C, and 22 with the second example dataset of FIG. 15 in accordance with an illustrative embodiment.
Figure 26:
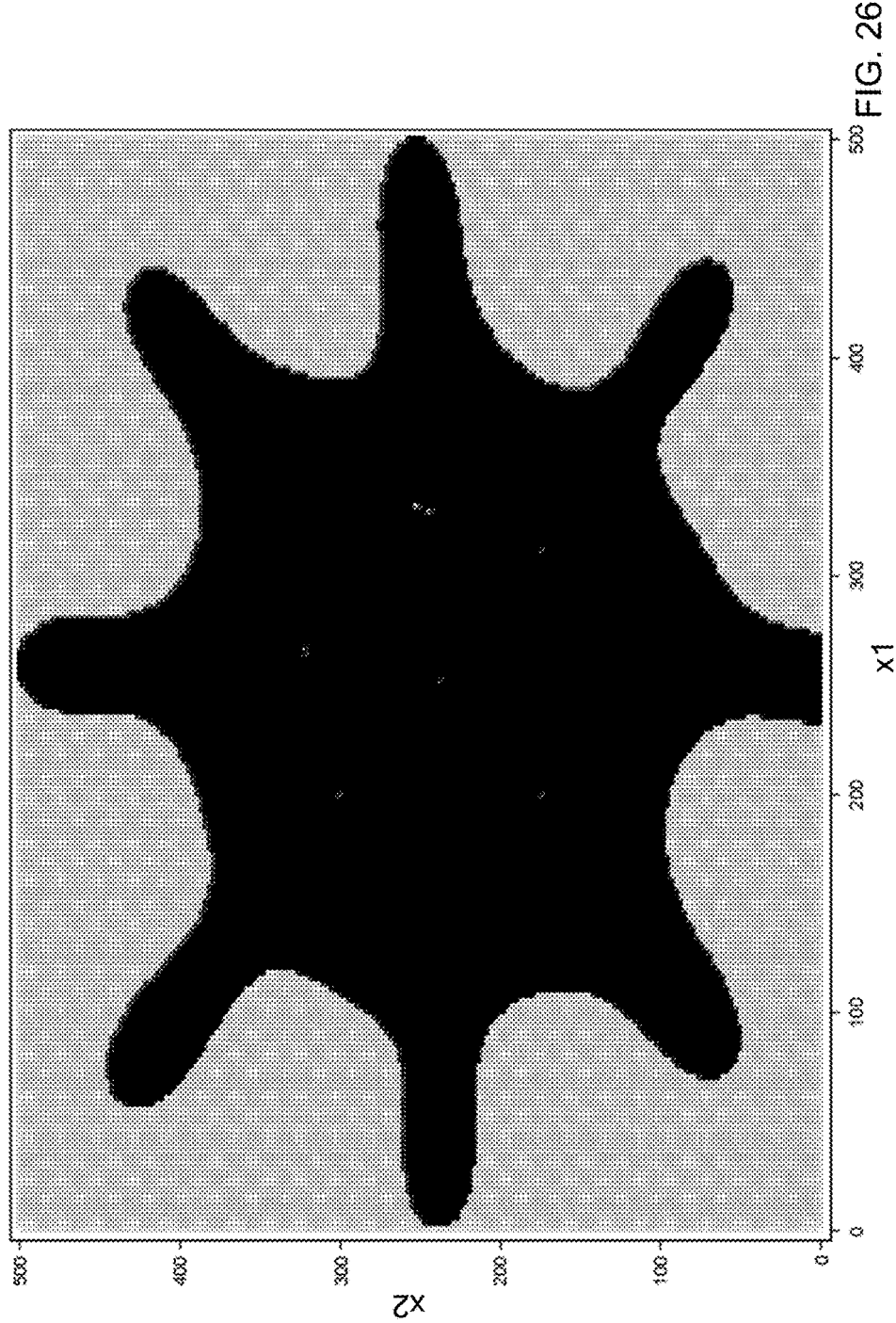
FIG. 26 depicts scoring results using an SVDD defined using the second example dataset of FIG. 15 in accordance with an illustrative embodiment.

FIG. 25 depicts scoring results using SVDD 126 computed using the operations of FIGS. 4A, 4B, 4C, and 22 with second example dataset 1500 as training dataset 124. FIG. 26 depicts scoring results using SVDD' computed by training using the entirety of second example dataset 1500 as training dataset 124 in a single iteration.

Figure 27:
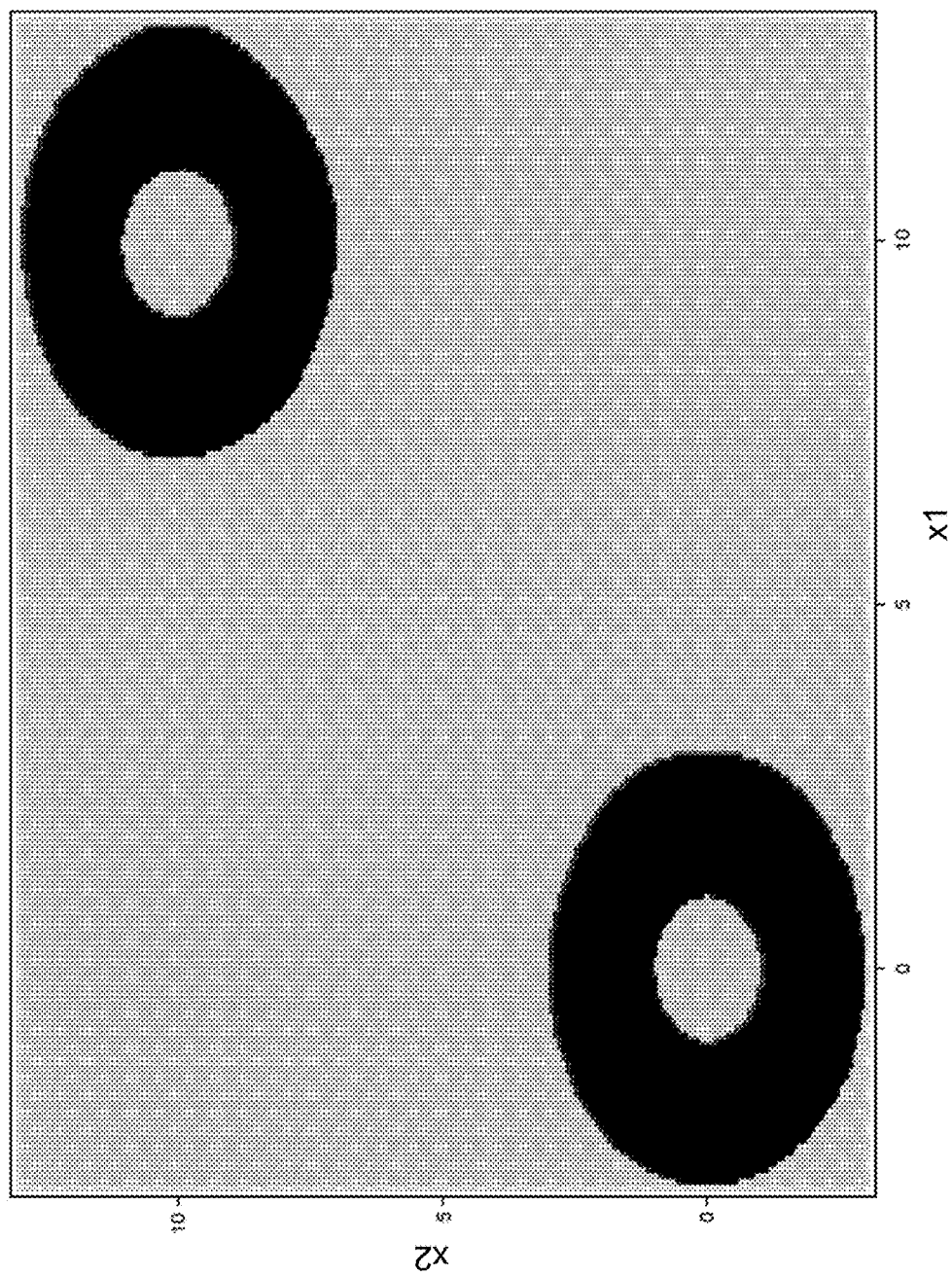
FIG. 27 depicts scoring results using the SVDD defined using the operations of FIGS. 4A, 4B, 4C, and 22 with the third example dataset of FIG. 17 in accordance with an illustrative embodiment.
Figure 28:
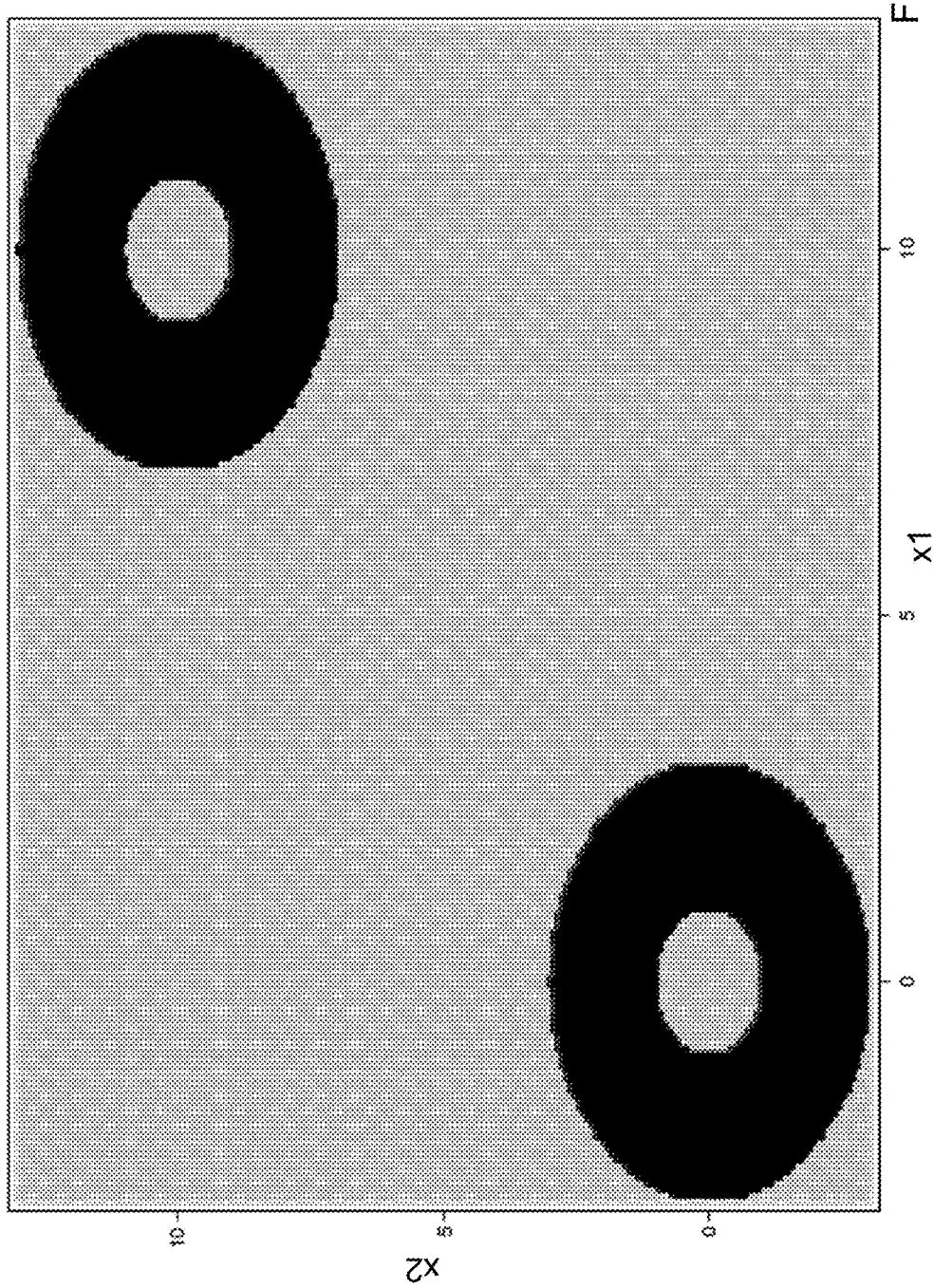
FIG. 28 depicts scoring results using an SVDD defined using the third example dataset of FIG. 17 in accordance with an illustrative embodiment.

FIG. 27 depicts scoring results using SVDD 126 computed using the operations of FIGS. 4A, 4B, 4C, and 22 with third example dataset 1700 as training dataset 124. FIG. 28 depicts scoring results using SVDD' computed by training using the entirety of third example dataset 1700 as training dataset 124 in a single iteration. The scoring results are similar in each case and were achieved with an approximately order of magnitude faster computational speed.

Training application 122 incrementally learns training dataset 124 at each iteration by computing SVDD 126 on an independent random sample selected with replacement from training dataset 124. The illustrative results show that training application 122 is extremely fast and provides a nearly identical data description as compared to training using the entire dataset in a single iteration. Training application 122 can be implemented as a wrapper code around a core module for SVDD training computations either in a single machine or in a multi-machine distributed environment.

There are applications for training application 122 in areas such as process control and equipment health monitoring where the size of training dataset 124 can be very large, consisting of a few million observations. Training dataset 124 may include sensor readings measuring multiple key health or process parameters at a very high frequency. For example, a typical airplane currently has 7,000 sensors measuring critical health parameters and creates 2.5 terabytes of data per day. By 2020, this number is expected to triple or quadruple to over 7.5 terabytes. In such applications, multiple SVDD training models may be developed with each representing a different operating mode of the equipment or different process settings. A successful application of SVDD in these types of application require algorithms that can train using huge amounts of training data in an efficient manner.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
    randomly select a first set of observation vectors from a training dataset, wherein a number of the first set of observation vectors is a predefined sample size;
    compute a first optimal value of an objective function defined for a support vector data description (SVDD) model using the selected first set of observation vectors to define a first set of support vectors, wherein the first set of support vectors define a first data description for the training dataset;
    (a) randomly select a second set of observation vectors from the training dataset, wherein a number of the second set of observation vectors is the predefined sample size;
    (b) compute a second optimal value of the objective function using the selected second set of observation vectors to define a second set of support vectors, wherein the second set of support vectors define a second data description for the training dataset;
    (c) update the first set of support vectors to include the defined second set of support vectors;
    (d) compute a third optimal value of the objective function using the updated first set of support vectors to define a third set of support vectors, wherein the third set of support vectors define a third data description for the training dataset;
    (e) compute a value of a stop parameter;
    (f) determine whether or not a stop condition is satisfied by comparing the computed value to a stop criterion;
    (g) when the stop condition is not satisfied,
        define the first set of support vectors as the defined third set of support vectors; and
        repeat (a)-(g) until the stop condition is satisfied; and
    when the stop condition is satisfied,
        output the defined third set of support vectors;
        compute a threshold using the defined third set of support vectors;
        read an observation vector from a scoring dataset;
        compute a distance value using the output third set of support vectors and the read observation vector;
        when the computed distance value is greater than the computed threshold, output an abnormal indicator indicating that the read observation vector is abnormal relative to the output third set of support vectors; and
        when the computed distance value is not greater than the computed threshold, output a normal indicator indicating that the read observation vector is normal relative to the output third set of support vectors.

2. The non-transitory computer-readable medium of claim 1, wherein the objective function defined for the SVDD model is $\max(\Sigma_{i=1}^{n} \alpha_i K(x_i, x_i) - \Sigma_{i=1}^{n}\Sigma_{j=1}^{n} \alpha_i \alpha_j K(x_i, x_j))$, subject to $\Sigma_{i=1}^{n}\alpha_i = 1$ and $0 \leq \alpha_i \leq C$, $\forall i = 1, \ldots, n$, where $K(x_i, x_j)$ is a kernel function, n is the predefined sample size, $C = 1/nf$ where f is an expected outlier fraction, $x_i$ and $x_j$ are the selected observation vectors for each computation, and $\alpha_i$ are Lagrange constants.

3. The non-transitory computer-readable medium of claim 2, wherein the expected outlier fraction is a predefined input value.

4. The non-transitory computer-readable medium of claim 2, wherein the $x_i$ that have $0 < \alpha_i \leq C$ are the defined set of support vectors for each computation.

5. The non-transitory computer-readable medium of claim 4, wherein, when the stop condition is satisfied, the computer-readable instructions further cause the computing device to output the Lagrange constants $\alpha_k$ for each of the defined third set of support vectors.

6. The non-transitory computer-readable medium of claim 2, wherein the kernel function is a Gaussian kernel function.

7. The non-transitory computer-readable medium of claim 1, wherein the threshold is computed using $R^2 = K(x_k, x_k) - 2\Sigma_{i=1}^{N}\alpha_i K(x_i, x_k) + \Sigma_{i=1}^{N}\Sigma_{j=1}^{N}\alpha_i \alpha_j K(x_i, x_j)$, where $x_k$ is any support vector of the output third set of support vectors, $x_i$ and $x_j$ are the defined third set of support vectors, $K(x_k, x_k)$ is a kernel function of the associated support vectors, $\alpha_i$ and $\alpha_j$ are Lagrange constants of the associated support vector, and N is a number of support vectors included in the defined third set of support vectors.

8. The non-transitory computer-readable medium of claim 7, wherein, when the stop condition is satisfied, the computer-readable instructions further cause the computing device to output the computed threshold for identifying the outlier.

9. The non-transitory computer-readable medium of claim 1, wherein the distance value is computed using $dist^2$ $(z) = K(z,z) - 2\Sigma_{i=1}^{N} \alpha_i K(x_i, z) + \Sigma_{i=1}^{N} \Sigma_{j=1}^{N} \alpha_i \alpha_j K(x_i, x_j)$, where z is the read observation vector, $x_i$ and $x_j$ are the output third set of support vectors, $K(z,z)$ is a kernel function of the associated vectors, $\alpha_i$ and $\alpha_j$ are Lagrange constants of the associated support vector, and N is a number of support vectors included in the output third set of support vectors.

10. The non-transitory computer-readable medium of claim 1, wherein each observation vector includes a plurality of values, wherein each value of the plurality of values is associated with a variable to define a plurality of variables, wherein each variable of the plurality of variables describes a characteristic of a physical object generated or captured by a device.

11. The non-transitory computer-readable medium of claim 10, wherein the predefined sample size is greater than a number of the plurality of variables.

12. The non-transitory computer-readable medium of claim 1, wherein, after (b) and before (c), the computer-readable instructions further cause the computing device to:
   initialize a set of iteration support vectors as the defined second set of support vectors; and
   a predefined number of times,
      randomly select a fourth set of observation vectors from the training dataset, wherein a number of the fourth set of observation vectors is the predefined sample size;
      compute a fourth optimal value of the objective function using the selected fourth set of observation vectors to define a fourth set of support vectors, wherein the fourth set of support vectors define a fourth data description for the training dataset; and
      update the set of iteration support vectors to include the defined fourth set of support vectors;
   wherein the updated set of iteration support vectors replace the defined second set of support vectors in (c).

13. The non-transitory computer-readable medium of claim 1, wherein the computed value is a number of iterations of (d), and the stop criterion is a predefined maximum number of iterations, wherein the determination is that the stop condition is satisfied when the computed value is greater than or equal to the predefined maximum number of iterations.

14. The non-transitory computer-readable medium of claim 2, wherein the computed value is computed using $c_p = \|\alpha_j - \alpha_{j-1}\| / \|\alpha_{j-1}\|$, where $\alpha_j = \Sigma_{i=1}^{N} \alpha_i x_i$ where $x_i$ are the defined support vectors for each computation, $\alpha_i$ is the Lagrange constant of the associated support vector, and N is a number of support vectors included in the defined set of support vectors for each computation, and $\alpha_{j-1} = \Sigma_{i=1}^{N_p} \alpha_{ip} x_{ip}$ where $x_{ip}$ are the defined support vectors for a previous computation, $\alpha_{ip}$ is the Lagrange constant of the associated previously computed support vector, and $N_p$ is a number of support vectors included in the defined set of support vectors for the previous computation, and the stop criterion is a predefined center tolerance value.

15. The non-transitory computer-readable medium of claim 14, wherein the determination is that the stop condition is satisfied when $c_p \leq \epsilon_1$, where $\epsilon_1$ is the predefined center tolerance value.

16. The non-transitory computer-readable medium of claim 7, wherein the computed value is computed using $c_p = \|R_j^2 - R_{j-1}^2\| / R_{j-1}^2$, where $R_j^2$ is the threshold computed using the defined third set of support vectors, and $R_{j-1}^2$ is the threshold computed using the defined first set of support vectors, and the stop criterion is a predefined distance tolerance value.

17. The non-transitory computer-readable medium of claim 16, wherein the determination is that the stop condition is satisfied when $c_p \leq \epsilon_1$, where $\epsilon_1$ is the predefined distance tolerance value.

18. The non-transitory computer-readable medium of claim 16, wherein a second computed value is computed using $c_{p2} = \|\alpha_j - \alpha_{j-1}\| / \|\alpha_{j-1}\|$, where $\alpha_j = \Sigma_{i=1}^{N} \alpha_i x_i$ is computed using the defined third set of support vectors, and $\alpha_{j-1} = \Sigma_{i=1}^{N_p} \alpha_{ip} x_{ip}$ is computed using the defined first set of support vectors, and a second stop criterion is a predefined center tolerance value.

19. The non-transitory computer-readable medium of claim 18, wherein the determination is that the stop condition is satisfied when $c_p \leq \epsilon_1$, where $\epsilon_1$ is the predefined distance tolerance value, and $c_{p2} \leq \epsilon_2$, where $\epsilon_2$ is the predefined center tolerance value.

20. The non-transitory computer-readable medium of claim 1, wherein determining whether or not the stop condition is satisfied comprises:
   determining a number of consecutive satisfactory comparisons between the computed value and the stop criterion for iterations of (f); and
   when the determined number of consecutive satisfactory comparisons exceeds a predefined threshold number, the determination is that the stop condition is satisfied.

21. A computing device comprising:
   a processor; and
   a non-transitory computer-readable medium operably coupled to the processor, the computer-readable medium having computer-readable instructions stored thereon that, when executed by the processor, cause the computing device to
      randomly select a first set of observation vectors from a training dataset, wherein a number of the first set of observation vectors is a predefined sample size;
      compute a first optimal value of an objective function defined for a support vector data description (SVDD) model using the selected first set of observation vectors to define a first set of support vectors, wherein the first set of support vectors define a first data description for the training dataset;
   (a) randomly select a second set of observation vectors from the training dataset, wherein a number of the second set of observation vectors is the predefined sample size;
   (b) compute a second optimal value of the objective function using the selected second set of observation vectors to define a second set of support vectors, wherein the second set of support vectors define a second data description for the training dataset;
   (c) update the first set of support vectors to include the defined second set of support vectors;
   (d) compute a third optimal value of the objective function using the updated first set of support vectors to define a third set of support vectors, wherein the third set of support vectors define a third data description for the training dataset;
   (e) compute a value of a stop parameter;
   (f) determine whether or not a stop condition is satisfied by comparing the computed value to a stop criterion;
   (g) when the stop condition is not satisfied,
      define the first set of support vectors as the defined third set of support vectors; and
      repeat (a)-(g) until the stop condition is satisfied; and
   when the stop condition is satisfied,
      output the defined third set of support vectors;

compute a threshold using the defined third set of support vectors;
read an observation vector from a scoring dataset;
compute a distance value using the output third set of support vectors and the read observation vector;
when the computed distance value is greater than the computed threshold, output an abnormal indicator indicating that the read observation vector is abnormal relative to the output third set of support vectors; and
when the computed distance value is not greater than the computed threshold, output a normal indicator indicating that the read observation vector is normal relative to the output third set of support vectors.

22. The computing device of claim 21, wherein determining whether or not the stop condition is satisfied comprises:
determining a number of consecutive satisfactory comparisons between the computed value and the stop criterion for iterations of (f); and
when the determined number of consecutive satisfactory comparisons exceeds a predefined threshold number, the determination is that the stop condition is satisfied.

23. The computing device of claim 21, wherein, after (b) and before (c), the computer-readable instructions further cause the computing device to:
initialize a set of iteration support vectors as the defined second set of support vectors; and
a predefined number of times,
randomly select a fourth set of observation vectors from the training dataset, wherein a number of the fourth set of observation vectors is the predefined sample size;
compute a fourth optimal value of the objective function using the selected fourth set of observation vectors to define a fourth set of support vectors, wherein the fourth set of support vectors define a fourth data description for the training dataset; and
update the set of iteration support vectors to include the defined fourth set of support vectors;
wherein the updated set of iteration support vectors replace the defined second set of support vectors in (c).

24. A method of determining a support vector data description for outlier identification, the method comprising:
randomly selecting, by a computing device, a first set of observation vectors from a training dataset, wherein a number of the first set of observation vectors is a predefined sample size;
computing, by the computing device, a first optimal value of an objective function defined for a support vector data description (SVDD) model using the selected first set of observation vectors to define a first set of support vectors, wherein the first set of support vectors define a first data description for the training dataset;
(a) randomly selecting, by the computing device, a second set of observation vectors from the training dataset, wherein a number of the second set of observation vectors is the predefined sample size;
(b) computing, by the computing device, a second optimal value of the objective function using the selected second set of observation vectors to define a second set of support vectors, wherein the second set of support vectors define a second data description for the training dataset;
(c) updating, by the computing device, the first set of support vectors to include the defined second set of support vectors;

(d) computing, by the computing device, a third optimal value of the objective function using the updated first set of support vectors to define a third set of support vectors, wherein the third set of support vectors define a third data description for the training dataset;
(e) computing, by the computing device, a value of a stop parameter;
(f) determining, by the computing device, whether or not a stop condition is satisfied by comparing the computed value to a stop criterion;
(g) when the stop condition is not satisfied,
defining, by the computing device, the first set of support vectors as the defined third set of support vectors; and
repeating (a)-(g), by the computing device, until the stop condition is satisfied; and
when the stop condition is satisfied,
outputting, by the computing device, the defined third set of support vectors;
computing, by the computing device, a threshold using the defined third set of support vectors;
reading, by the computing device, an observation vector from a scoring dataset;
computing, by the computing device, a distance value using the output third set of support vectors and the read observation vector;
when the computed distance value is greater than the computed threshold, outputting, by the computing device, an abnormal indicator indicating that the read observation vector is abnormal relative to the output third set of support vectors; and
when the computed distance value is not greater than the computed threshold, outputting, by the computing device, a normal indicator indicating that the read observation vector is normal relative to the output third set of support vectors.

25. The method of claim 24, wherein determining whether or not the stop condition is satisfied comprises:
determining a number of consecutive satisfactory comparisons between the computed value and the stop criterion for iterations of (f); and
when the determined number of consecutive satisfactory comparisons exceeds a predefined threshold number, the determination is that the stop condition is satisfied.

26. The method of claim 24, further comprising, after (b) and before (c):
initialize a set of iteration support vectors as the defined second set of support vectors; and
a predefined number of times,
randomly select a fourth set of observation vectors from the training dataset, wherein a number of the fourth set of observation vectors is the predefined sample size;
compute a fourth optimal value of the objective function using the selected fourth set of observation vectors to define a fourth set of support vectors, wherein the fourth set of support vectors define a fourth data description for the training dataset; and
update the set of iteration support vectors to include the defined fourth set of support vectors;
wherein the updated set of iteration support vectors replace the defined second set of support vectors in (c).

27. The method of claim 24, wherein each observation vector includes a plurality of values, wherein each value of the plurality of values is associated with a variable to define a plurality of variables, wherein each variable of the plurality of variables describes a characteristic of a physical object generated or captured by a device, wherein the predefined sample size is greater than a number of the plurality of variables.

28. The method of claim 24, wherein the objective function defined for the SVDD model is $\max(\Sigma_{i=1}^{N}\alpha_i K(x_i, x_k)+\Sigma_{i=1}^{N}\Sigma_{j=1}^{N}\alpha_i\alpha_j K(x_i, x_j))$, subject to $\Sigma_{i=1}^{N}\alpha_i = 1$ and $0 \leq \alpha_i \leq C$, $\forall = 1, \ldots, n$, where n is the predefined sample size, $C = 1/nf$ where f is an expected outlier fraction, $x_i$ and $x_1$ are the selected observation vectors for each computation, $K(x_i, x_1)$ is a kernel function of the associated observation vectors, and $\alpha_i$ are Lagrange constants.

29. The method of claim 24, wherein the threshold is computed using $R^2 = K(x_k, x_k) - 2\Sigma_{i=1}^{N}\alpha_i K(x_i, x_k) + \Sigma_{i=1}^{N}\Sigma_{j=1}^{N}\alpha_i\alpha_j K(x_i, x_j)$, where $x_k$ is any support vector of the defined third set of support vectors, $x_i$ and $x_j$ are the output third set of support vectors, $K(x_k, x_k)$ is a kernel function of the associated support vectors, $\alpha_i$ and $\alpha_1$ are Lagrange constants of the associated support vector, and N is a number of support vectors included in the defined third set of support vectors.

30. The method of claim 24, wherein the distance value is computed using $\text{dist}^2(z) = K(z,z) - 2\Sigma_{i=1}^{N}\alpha_i K(x_i, z) + \Sigma_{i=1}^{N}\Sigma_{j=1}^{N}\alpha_i\alpha_j K(x_i, x_j)$, where z is the read observation vector, $x_i$ and $x_j$ are the output third set of support vectors, $K(z, z)$ is a kernel function of the associated vectors, $\alpha_i$ and $\alpha_j$ are Lagrange constants of the associated support vector, and N is a number of support vectors included in the output third set of support vectors.

* * * * *

UNITED STATES PATENT AND TRADEMARK OFFICE
CERTIFICATE OF CORRECTION

PATENT NO. : 9,830,558 B1
APPLICATION NO. : 15/185277
DATED : November 28, 2017
INVENTOR(S) : Arin Chaudhuri et al.

It is certified that error appears in the above-identified patent and that said Letters Patent is hereby corrected as shown below:

In the Specification

Column 7, Line 7:
Delete "where $x_i \in \mathbb{R}^{m\,m}$, $i = 1, \ldots, n$" and replace with --where $x_i \in \mathbb{R}^m$, $i = 1, \ldots, n$--

Column 8, Line 30, Equation 14:
Delete " $dist^2(z) = K(z,z) - 2\sum_{i=1}^{N_{SV}} \alpha_i K(x_i, z) + \sum_{i=1}^{N_{SV}} \sum_{j=1}^{N_{SV}} \alpha_i \alpha_i K(x_i, x_j)$ ," and replace with -- $dist^2(z) = K(z,z) - 2\sum_{i=1}^{N_{SV}} \alpha_i K(x_i, z) + \sum_{i=1}^{N_{SV}} \sum_{j=1}^{N_{SV}} \alpha_i \alpha_j K(x_i, x_j)$ --

Column 13, Lines 61-66:
Delete "The a convergence parameter may be computed as $c_{pa} = \|\alpha_j - \alpha_{j-1}\| / \|\alpha_{j-1}\|$, where $\alpha_j = \sum_{i=1}^{N_{SV}} \alpha_i x_i$ is computed using the third set of support vectors as $x_i$, and $\alpha_{j-1} = \sum_{i=1}^{N_{SV}} \alpha_i x_i$ is computed using the first set of support vectors as $x_i$. Prior to computing $c_{pa}$, a value of $\alpha_{j-1}$ may be tested to determine if the value is zero. If so, $c_{pa}$ may be set to a very large value." and replace with --The a convergence parameter may be computed as $c_{pa} = \|a_j - a_{j-1}\| / \|a_{j-1}\|$, where $a_j = \sum_{i=1}^{N_{SV}} \alpha_i x_i$ is computed using the third set of support vectors as $x_i$, and $a_{j-1} = \sum_{i=1}^{N_{SV}} \alpha_i x_i$ is computed using the first set of support vectors as $x_i$. Prior to computing $c_{pa}$, a value of $a_{j-1}$ may be tested to determine if the value is zero. If so, $c_{pa}$ may be set to a very large value--

Column 15, Lines 42-43:
Delete "$\epsilon_a = \epsilon_R = 1e - 5$" and replace with --$\epsilon_a = \epsilon_R = 1e - 5$--

Signed and Sealed this
Twenty-fourth Day of April, 2018

Andrei Iancu
*Director of the United States Patent and Trademark Office*

CERTIFICATE OF CORRECTION (continued)
U.S. Pat. No. 9,830,558 B1

Column 15, Line 67:
Delete "$\epsilon_a = \epsilon_R = 1e - 5$" and replace with --$\epsilon_a = \epsilon_R = 1e - 5$--

Column 17, Line 1:
Delete "center position α" and replace with --center position $a$--

Column 17, Lines 4-5:
Delete "center position α" and replace with --center position $a$--

Column 20, Lines 4-5:
Delete "$dist^2(z) = K(z,z) - 2\sum_{i=1}^{Nsv} \alpha_i K(x_i, z) + \sum_{i=1}^{Nsv} \alpha_i \alpha_j K(x_i, x_j)$," and replace with --$dist^2(z) = K(z,z) - 2\sum_{i=1}^{Nsv} \alpha_i K(x_i, z) + \sum_{i=1}^{Nsv} \sum_{j=1}^{Nsv} \alpha_i \alpha_j K(x_i, x_j)$--